(12) United States Patent
Zhou et al.

(10) Patent No.: US 12,274,209 B1
(45) Date of Patent: Apr. 15, 2025

(54) BALING MECHANISM OF COTTON PICKER AND CONTROL SYSTEM OF BALING MECHANISM

(71) Applicants: JIANGSU UNIVERSITY, Jiangsu (CN); Jiangsu World High-Tech Agriculture Equipment Ltd., Jiangsu (CN)

(72) Inventors: Maile Zhou, Jiangsu (CN); Xuegeng Chen, Jiangsu (CN); Jainjun Yin, Jiangsu (CN); Weijun Jiang, Jiangsu (CN); Tiaotiao Li, Jiangsu (CN); Guohui Wu, Jiangsu (CN)

(73) Assignees: JIANGSU UNIVERSITY, Jiangsu (CN); Jiangsu World High-Tech Agriculture Equipment Ltd., Jiangsu (CN)

( * ) Notice: Subject to any disclaimer, the term of this patent is extended or adjusted under 35 U.S.C. 154(b) by 0 days.

(21) Appl. No.: 18/890,087

(22) Filed: Sep. 19, 2024

Related U.S. Application Data

(63) Continuation of application No. PCT/CN2024/104119, filed on Jul. 8, 2024.

(30) Foreign Application Priority Data

Jun. 21, 2024 (CN) .......................... 202410818637.5

(51) Int. Cl.
  *A01F 15/08* (2006.01)
  *A01F 15/07* (2006.01)
  *A01F 15/18* (2006.01)

(52) U.S. Cl.
  CPC .......... *A01F 15/0883* (2013.01); *A01F 15/07* (2013.01); *A01F 15/18* (2013.01); *A01F 2015/077* (2013.01)

(58) Field of Classification Search
  CPC .. A01F 15/0705; A01F 15/0883; A01F 15/07; A01F 15/18; A01F 2015/074;
  (Continued)

(56) References Cited

U.S. PATENT DOCUMENTS 4,062,172 A * 12/1977 Rice .................... A01F 15/0705
  100/88
4,121,513 A * 10/1978 Kopaska ................. A01F 15/07
  100/88
(Continued)

FOREIGN PATENT DOCUMENTS

DE       3734186 A  *  4/1989  ............. A01F 15/07
DE       4012755 C  * 10/1991  ............. A01F 15/07
(Continued)

*Primary Examiner* — Adam J Behrens
(74) *Attorney, Agent, or Firm* — WCF IP

(57) ABSTRACT

A baling mechanism of a cotton picker and a control system of the baling mechanism are provided. The baling mechanism of the cotton picker includes a fixed box and a movable box. A fixed rocker arm, a fixed rocker arm driving cylinder, a fixed roller system and a fixed baling belt are arranged in the fixed box, and the movable box is hinged with the fixed box. A movable rocker arm, a movable rocker arm driving cylinder, a movable roller system and a movable baling belt are arranged in the movable box. A cotton bale forming chamber is jointly enclosed and formed by the fixed baling belt and the movable baling belt. In this disclosure, a multi-way valve is used to control the flow rate of oil circuits where the fixed rocker arm driving cylinder and the rocker arm driving oil cylinder are located, respectively.

15 Claims, 20 Drawing Sheets

(58) Field of Classification Search
CPC ........ A01F 2015/078; A01F 2015/0795; A01F 2015/183; A01F 2015/077; A01D 46/081–088; A01D 46/10–18
See application file for complete search history.

(56) References Cited

U.S. PATENT DOCUMENTS

| | | | | |
|---|---|---|---|---|
| 4,534,285 | A * | 8/1985 | Underhill | A01F 15/0705 100/88 |
| 4,550,557 | A * | 11/1985 | Vissers | A01F 15/07 56/341 |
| 4,667,592 | A * | 5/1987 | Pentith | A01F 15/0705 100/88 |
| 5,768,986 | A * | 6/1998 | Arnold | B65G 45/14 53/118 |
| 2005/0081502 | A1 * | 4/2005 | Fox | A01F 15/07 56/341 |
| 2015/0373916 | A1 * | 12/2015 | Roberge | A01F 15/0705 56/341 |
| 2023/0413732 | A1 * | 12/2023 | Wigdahl | A01F 15/106 |
| 2024/0284833 | A1 * | 8/2024 | Mate | A01F 15/08 |

FOREIGN PATENT DOCUMENTS

| | | | | |
|---|---|---|---|---|
| EP | 850558 | A1 * | 7/1998 | ............. A01F 15/07 |
| EP | 1595439 | A2 * | 11/2005 | ......... A01F 15/0833 |
| EP | 3626044 | A1 * | 3/2020 | ............. A01F 15/07 |
| WO | WO-2013157948 | A1 * | 10/2013 | ......... A01F 15/0705 |

* cited by examiner

BALING MECHANISM OF COTTON PICKER AND CONTROL SYSTEM OF BALING MECHANISM

CROSS-REFERENCE TO RELATED APPLICATION

This application is a continuation of International Patent Application No. PCT/CN2024/104119, filed on Jul. 8, 2024, which claims priority of the Chinese Patent Application No. 202410818637.5, filed with the China National Intellectual Property Administration on Jun. 21, 2024, and entitled "BALING MECHANISM OF COTTON PICKER AND CONTROL SYSTEM OF BALING MECHANISM", both of which are incorporated by references in their entities.

TECHNICAL FIELD

The present disclosure relates to the technical field of cotton picking and baling, and in particular to a baling mechanism of a cotton picker, and a control system of the baling mechanism.

BACKGROUND

Cotton is an economic strategic material in China, an important cash crop, and a raw material for the textile industry, and its harvest has an important impact on national economic and social development. With the development of economy, the picking and baling of the cotton have been mechanized. At present, most cotton pickers are box-type cotton pickers. However, by this harvesting method, it is required to transport the seed cotton picked from the cotton field to the warehouse, resulting in that not only the working efficiency is low, but also for example the picked cotton has high impurity content and is easy to lose. Cotton picking baler can directly compress and bale the picked seed cotton and unload the bale by opening the box during working in the cotton field.

The baling mechanism is the core component of the cotton picking baler, which directly affects whether the cotton picking baler can work continuously and stably. At present, most cotton picking balers use a whole baling belt, resulting in that the baling system is complex in structure, has a long single belt, and is difficult to assemble and debug. During working, the belt is large in stretching amount and low in fatigue life.

SUMMARY

An objective of the present disclosure is to provide a baling mechanism of a cotton picker, and a control system of the baling mechanism, so as to solve the problems in the prior art, simplifying a structure of the baling mechanism, reducing the assembly and debugging difficulty of a baling system, and improving the uniformity and compactness of a cotton bale.

To achieve this objective above, the technical solutions provided by the present disclosure are as follows:

A baling mechanism of a cotton picker includes:

a fixed box, arranged on a frame of the cotton picker, where a fixed rocker arm, a fixed rocker arm driving cylinder, a fixed roller system and a fixed baling belt are arranged in the fixed box, one end of the fixed rocker arm is rotatably connected to the fixed box, and the fixed rocker arm is hinged with the fixed rocker arm driving cylinder, which drives the fixed rocker arm to swing; the fixed roller system includes multiple fixed guide rollers, the fixed guide rollers are rotatably arranged in the fixed box, the fixed rocker arm and the fixed guide roller are in cooperation to tension the fixed baling belt and to drive the fixed baling belt to rotate; and a movable box, hinged with the fixed box, where a movable rocker arm, a movable rocker arm driving cylinder, a movable roller system and a movable baling belt are arranged in the movable box, one end of the movable rocker arm is rotatably connected to the movable box, and the movable rocker arm is hinged with the movable rocker arm driving cylinder, which moves the movable rocker arm to swing, a swing end of the movable rocker arm is arranged close to a swing end of the fixed rocker arm; the movable roller system includes multiple movable guide rollers, and the movable guide rollers are rotatably arranged in the movable box; and the fixed rocker arm, the movable rocker arm and the movable guide rollers are in cooperation to tension the movable baling belt and to drive the movable baling belt to rotate.

A cotton bale forming chamber is jointly enclosed and formed by the fixed rocker arm, the fixed baling belt and the movable baling belt. A cotton feeding channel is formed by a bottom gap between the fixed baling belt and the movable baling belt. The cotton feeding channel is communicated with the cotton bale forming chamber, the fixed rocker arm is driven by the fixed rocker arm driving cylinder to swing, the movable rocker arm is driven by the movable rocker arm driving cylinder to swing, such that a volume of the cotton bale forming chamber is capable of being increased to adapt to an increase of a rolled cotton bale.

Preferably, the fixed rocker arm includes a fixed rocker arm articulated shaft, a first fixed rocker arm roller, a second fixed rocker arm roller, a third fixed rocker arm roller, a first fixed connecting rod, and a second fixed connecting rod. The fixed rocker arm articulated shaft is hinged with the fixed box, the first fixed connecting rod is fixedly connected to the fixed rocker arm articulated shaft and the second fixed connecting rod, the first fixed rocker arm roller and the second fixed rocker arm roller are rotatably arranged on the second fixed connecting rod, and located on one end, away from the first fixed connecting rod, of the second fixed connecting rod. The third fixed rocker arm roller is arranged at a joint of the first fixed connecting rod and the second fixed connecting rod. The fixed baling belt and the movable baling belt both pass between the first fixed rocker arm roller and the second fixed rocker arm roller, the fixed baling belt is abutted against the second fixed rocker arm roller and the third fixed rocker arm roller, and the movable baling belt is abutted against the first fixed rocker arm roller.

Two groups of the first fixed connecting rods and two groups of the second fixed connecting rods are provided, thus making the fixed rocker arm to form a frame structure.

Preferably, the fixed rocker arm further includes a fixed driving rod, one end of the fixed driving rod is connected to the fixed rocker arm articulated shaft, and an other end of the fixed driving rod is hinged with the fixed rocker arm driving cylinder.

Preferably, the fixed roller system includes a first fixed guide roller, a second fixed guide roller, a third fixed guide roller and a fourth fixed guide roller which are rotationally arranged in the fixed box. The fixed baling belt is wound around the first fixed guide roller, the second fixed guide roller, the third fixed guide roller, the third fixed rocker arm roller, the fourth fixed guide roller and the second fixed rocker arm roller arranged in sequence.

Preferably, the movable rocker arm includes a movable rocker arm articulated shaft, a movable rocker arm roller, and a movable connecting rod. The movable rocker arm articulated shaft is rotatably connected to the movable box, the movable rocker arm articulated shaft is connected to an end of the movable connecting rod, the other end of the movable connecting rod is hinged with the movable rocker arm roller, and the movable baling belt is abutted against the movable rocker arm roller.

Two groups of the movable connecting rods are provided, and the two groups of the movable connecting rods are arranged at two axial ends of the movable rocker arm articulated shaft and the movable rocker arm roller, respectively, thus making the movable rocker arm form a frame structure.

Preferably, the movable rocker arm further includes a movable driving rod, one end of the movable driving rod is connected to the movable rocker arm articulated shaft, and an other end of the movable driving rod is hinged with the movable rocker arm driving cylinder.

Preferably, the movable roller system includes a first movable guide roller, a second movable guide roller, a third movable guide roller and a fourth movable guide roller which are rotationally arranged in the movable box. The movable baling belt is wound around the first movable guide roller, the movable rocker arm roller, the second movable guide roller, the third movable guide roller, the fourth movable guide roller and the first fixed rocker arm roller arranged in sequence.

Preferably, the fixed rocker arm includes a first fixed rocker arm roller, a scaffolding cylinder, a fixed support arm, a fixed side arm, a fixed rotating shaft, and a second fixed rocker arm roller. The fixed rotating shaft is rotatably arranged in the fixed box, one end of the fixed support arm and one end of the fixed side arm are both fixed to the fixed rotating shaft, an other end of the fixed support arm is hinged with the fixed rocker arm driving cylinder, and an other end of the fixed side arm is hinged with the second fixed rocker arm roller. A fixed end of the scaffolding cylinder is fixed to the fixed side arm, and a free end of the scaffolding cylinder is hinged with the first fixed rocker arm roller; and the fixed baling belt bypasses the first fixed rocker arm roller and the second fixed rocker arm roller.

Two groups of the fixed support arms, two groups of the fixed side arms and two groups of the scaffolding cylinders are provided, thus making the fixed rocker arm form a frame structure.

The movable rocker arm includes a first movable rocker arm roller, a second movable rocker arm roller, a movable side arm, a movable support arm, and a movable rotating shaft. The movable rotating shaft is rotatably arranged in the movable box, one end of the movable side arm and one end of the movable support arm are both fixed to the movable rotating shaft, and an other end of the movable support arm is hinged with the movable rocker arm driving cylinder. The first movable rocker arm roller and the second movable rocker arm roller are both hinged with an other end of the movable side arm, and the movable baling belt bypasses the first movable rocker arm roller and the second movable rocker arm roller.

Two groups of the movable side arms and two groups of the movable support arms are provided, thus making the movable rocker arm form a frame structure.

Preferably, the fixed roller system includes a first fixed guide roller, a second fixed guide roller, a third fixed guide roller and a fourth fixed guide roller which are rotationally arranged in the fixed box. The fixed baling belt is wound around the first fixed guide roller, the second fixed guide roller, the third fixed guide roller, the second fixed rocker arm roller, the fourth fixed guide roller and the first fixed rocker arm roller arranged in sequence. A fixed motor is connected to the first fixed guide roller.

The movable roller system includes a first movable guide roller, a second movable guide roller, a third movable guide roller and a fourth movable guide roller which are rotationally arranged in the movable box. The movable baling belt is wound around the first movable guide roller, the second movable rocker arm roller, the second movable guide roller, the third movable guide roller, the fourth movable guide roller and the first movable rocker arm roller arranged in sequence. A movable motor is connected to the first movable guide roller.

Preferably, the fixed rocker arm includes a fixed rocker arm body, and a first fixed rocker arm roller and a second fixed rocker arm roller which are rotationally arranged on the fixed rocker arm body. One end of the fixed rocker arm body is rotatably connected to the fixed box, the fixed rocker arm body is of a bent structure, and the first fixed rocker arm roller is arranged at a bend of the fixed rocker arm body. The second fixed rocker arm roller is arranged on an other end of the fixed rocker arm body, and the fixed rocker arm body is connected to the fixed rocker arm driving cylinder.

The movable rocker arm includes a movable rocker arm body, and a first movable rocker arm roller and a second movable rocker arm roller rotationally arranged on the movable rocker arm body. One end of the movable rocker arm body is rotatably connected to the movable box, the movable rocker arm body is of a bent structure, and the first movable rocker arm roller is arranged at a bend of the movable rocker arm body. The second movable rocker arm roller is arranged on an other end of the movable rocker arm body, and the movable rocker arm body is connected to the movable rocker arm driving cylinder.

Preferably, the baling mechanism of a cotton picker further includes a limit baling belt. The limit baling belt is tensioned by using a first driven roller and a second driven roller, the first driven roller and the second driven roller are both rotatably arranged in the fixed box, and the cotton bale forming chamber is jointly enclosed and formed by the fixed baling belt, the limit baling belt and the movable baling belt. When the fixed rocker arm driving cylinder and the movable rocker arm driving cylinder reach a maximum stroke, the first driven roller and the second driven roller are located between the second fixed rocker arm roller and the second movable rocker arm roller to limit a maximum diameter of a cotton bale.

Preferably, the fixed roller system includes a first fixed guide roller, a second fixed guide roller, a third fixed guide roller and a fourth fixed guide roller which are rotationally arranged in the fixed box. The fixed baling belt is wound around the first fixed guide roller, the second fixed guide roller, the third fixed guide roller, the first fixed rocker arm roller, the fourth fixed guide roller and the second fixed rocker arm roller arranged in sequence. A feeding device is arranged at a position, close to the first fixed guide roller, in the fixed box.

The movable roller system includes a first movable guide roller, a second movable guide roller, a third movable guide roller and a fourth movable guide roller which are rotationally arranged in the movable box. The movable baling belt is wound around the first movable guide roller, the first movable rocker arm roller, the second movable guide roller, the third movable guide roller, the fourth movable guide roller and the second movable rocker arm roller arranged in sequence.

Preferably, the fixed box is hinged with the frame of the cotton picker, and a hinge point of the fixed box and the frame of the cotton picker is away from a hinge point of the fixed box and the movable box.

Preferably, angle sensors are arranged in the fixed box and the movable box to monitor swing angles of the fixed rocker arm and the movable rocker arm, and the angle sensors are connected to the fixed rocker arm and the movable rocker arm by using a parallelogram mechanism.

A control system of the baling mechanism of a cotton picker is provided by the present disclosure. Both the fixed rocker arm driving cylinder and the movable rocker arm driving cylinder are communicated with a fuel tank of the cotton picker by using a multi-way valve, the fixed rocker arm driving cylinder is connected in parallel with a first overflow valve, and the movable rocker arm driving cylinder is connected in parallel with a second overflow valve.

The control system of the baling mechanism of a cotton picker includes the following operation processes:

baling process: a cotton bale forming chamber is in a empty state, the multi-way valve is configured to control flow rates of oil circuits where the fixed rocker arm driving cylinder and the movable rocker arm driving cylinder are located, and the first overflow valve and the second overflow valve are configured to restrain a tensile force of the fixed baling belt and the movable baling belt, thus determining a baling density of the cotton bale;

bin opening and bale unloading process: when the fixed rocker arm driving cylinder and the movable rocker arm driving cylinder reach a maximum stroke, the baling process is finished, the multi-way valve is switched to a non-working position, the fixed rocker arm driving cylinder and the movable rocker arm driving cylinder are both in a locked state, such that the movable box is capable of rotating smoothly to open the bin and unload the bale; and bin closing process: after the bin is opened for unloading the bale, the fixed baling belt and the movable baling belt are in a loosening state, the multi-way valve is switched to a working position to control the flow rates of oil circuits where the fixed rocker arm driving cylinder and the movable rocker arm driving cylinder are located, the fixed rocker arm driving cylinder and the movable rocker arm driving cylinder are reset to close the bin, and after the bin is closed, the movable box returns to an original state.

Compared with the prior art, the present disclosure has the following technical effects: the baling mechanism of the cotton picker includes a fixed box, and a movable box. The fixed box is arranged on a frame of the cotton picker. A fixed rocker arm, a fixed rocker arm driving cylinder, a fixed roller system and a fixed baling belt are arranged in the fixed box. One end of the fixed rocker arm is rotatably connected to the fixed box, an other end of the fixed rocker arm is hinged with the fixed rocker arm driving cylinder, and the fixed rocker arm driving cylinder can drive the fixed rocker arm to swing. The fixed roller system includes multiple fixed guide rollers which are rotatably arranged in the fixed box. The fixed rocker arm and the fixed guide roller are in cooperation to tension the fixed baling belt and to drive the fixed baling belt to rotate. The movable box is hinged with the fixed box. A movable rocker arm, a movable rocker arm driving cylinder, a movable roller system and a movable baling belt are arranged in the movable box. One end of the movable rocker arm is rotatably connected to the movable box, and an other end of the movable rocker arm is hinged with the movable rocker arm driving cylinder. The movable rocker arm driving cylinder can drive the movable rocker arm to swing, and a swing end of the movable rocker arm is arranged close to a swing end of the fixed rocker arm. The movable roller system includes multiple movable guide rollers which are rotatably arranged in the movable box. The fixed rocker arm, the movable rocker arm and the movable guide roller are in cooperation to tension the movable baling belt and to drive the movable baling belt to rotate. A cotton bale forming chamber is jointly enclosed and formed by the fixed rocker arm, the fixed baling belt and the movable baling belt. A cotton feeding channel is formed by a bottom gap between the fixed baling belt and the movable baling belt. The cotton feeding channel is communicated with the cotton bale forming chamber, the fixed rocker arm is driven by the fixed rocker arm driving cylinder to swing, the movable rocker arm is driven by the movable rocker arm to swing, such that the volume of the cotton bale forming chamber can be increased to adapt to the increase of a rolled cotton bale.

According to the baling mechanism of the cotton picker in the present disclosure, the cotton bale forming chamber is jointly enclosed and formed by the fixed baling belt and the movable baling belt. When the baling mechanism works, as cotton is fed from a cotton feeding channel, the fixed rocker arm swings counterclockwise, the movable rocker arm swings clockwise, and the fixed baling belt and the movable baling belt rotate clockwise, respectively, making the movable rocker arm, the fixed rocker arm, the fixed baling belt and the movable baling belt jointly act on a cotton bale. The cotton bale is rolled and formed under the joint action of the fixed baling belt, the movable baling belt, the fixed roller system and the movable roller system, thus forming a round cotton bale with uniform density. When the fixed rocker arm driving cylinder and the movable rocker arm driving cylinder reach a maximum stroke, the cotton bale reaches a maximum diameter, the movable box is flipped counterclockwise by a certain angle relative to the fixed box, and the cotton bale is rolled and unloaded under the joint action of the own gravity and the tensile force of the fixed baling belt. The baling mechanism of the cotton picker in the present disclosure is simple in structure and convenient to mount. By adopting the form of a fixed baling belt and a movable baling belt, the problem of fatigue failure caused by large amount of expansion and contraction variation of the baling belt in the baling system in the prior art is solved, and the uniformity and compactness of the cotton bale are effectively ensured.

A control system of the baling mechanism of a cotton picker is further provided in the present disclosure. A multi-way valve is used to control the flow rates of the oil circuits where the fixed rocker arm driving cylinder and the movable rocker arm driving cylinder are located, and overflow valves are used to restrain the tensile force of the fixed baling belt and the movable baling belt, thus determining the baling density of the cotton bale, improving the controllability of the baling mechanism of the cotton picker, adjusting a working state of the baling mechanism of the cotton picker according to different working conditions, and improving the flexibility and adaptability of the baling mechanism of the cotton picker.

BRIEF DESCRIPTION OF THE DRAWINGS

To describe the technical solutions of the embodiments of the present disclosure or in the prior art more clearly, the following briefly introduces the accompanying drawings required and used in the embodiments. Apparently, the accompanying drawings in the following description show merely some embodiments of the present disclosure, and those skilled in the art may still derive other drawings in accordance with these accompanying drawings without creative efforts.

Reference signs in FIG. 1 to FIG. 13 are as follows: 100, baling mechanism of cotton picker; 200, control system;

1, fixed box; 101, fixed rocker arm; 102, fixed rocker arm driving cylinder; 103, fixed baling belt; 104, fixed rocker arm articulated shaft; 105, first fixed rocker arm roller; 106, second fixed rocker arm roller; 107, third fixed rocker arm roller; 108, first fixed connecting rod; 109, second fixed connecting rod; 110, fixed driving rod; 111, first fixed guide roller; 112, second fixed guide roller; 113, third fixed guide roller; 114, fourth fixed guide roller;

2, movable box; 201, movable rocker arm; 202, movable rocker arm driving cylinder; 203, movable baling belt; 204, movable rocker arm articulated shaft; 205, movable rocker arm roller; 206, movable connecting rod; 207, movable driving rod; 208, first movable guide roller; 209, second movable guide roller; 210, third movable guide roller; 211, fourth movable guide roller;

3, controller; 4, pressure indicator; 5, first overflow valve; 6, gear pump; 7, fuel tank; 8, second overflow valve; 9, multi-way valve; 10, oil cooler; 11, oil filter; 12, cotton bale;

$O_1$, hinge point of fixed rocker arm and fixed box; $O_2$, hinge point of movable rocker arm and movable box; $\omega_1$, rotating direction of fixed rocker arm; $\omega_2$, rotating direction of movable rocker arm; $K_1$, hinge point of fixed box and frame of cotton picker; $K_2$, hinge point of fixed box and movable box; $S_1$, stroke of movable rocker arm driving cylinder; $S_2$, stroke of fixed rocker arm driving cylinder.

Figure 14:
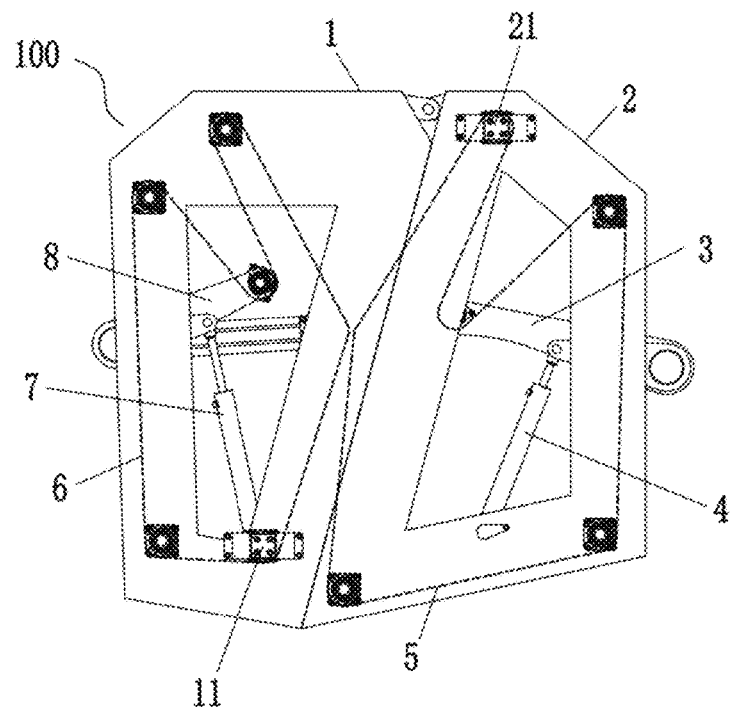
Figure 15:
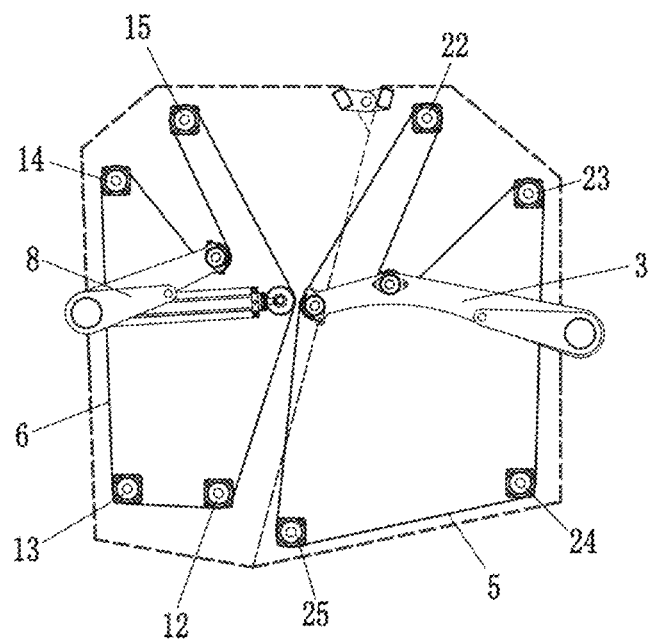
Figure 16:
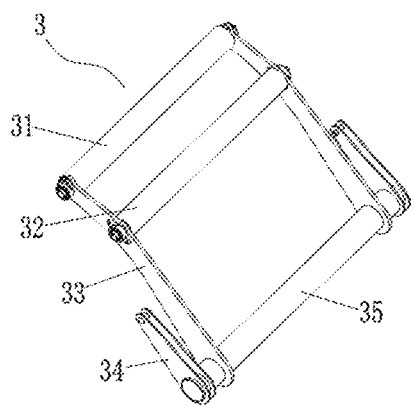
Figure 17:
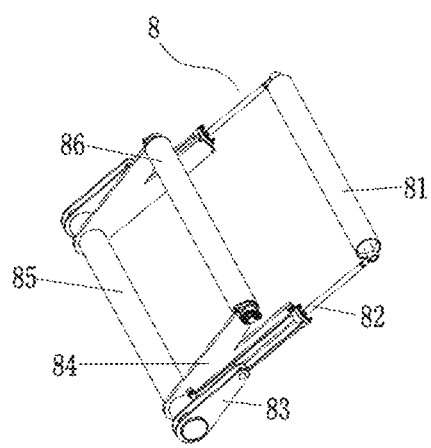
Figure 18:
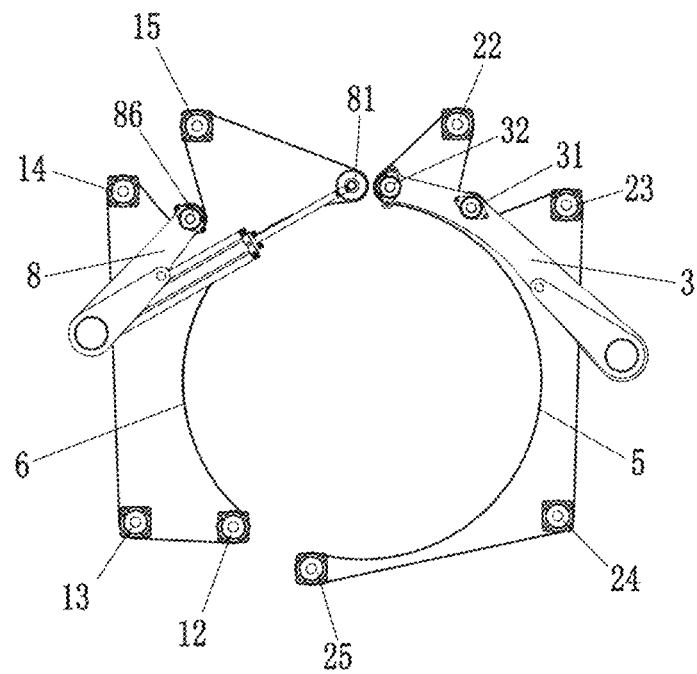
Figure 19:
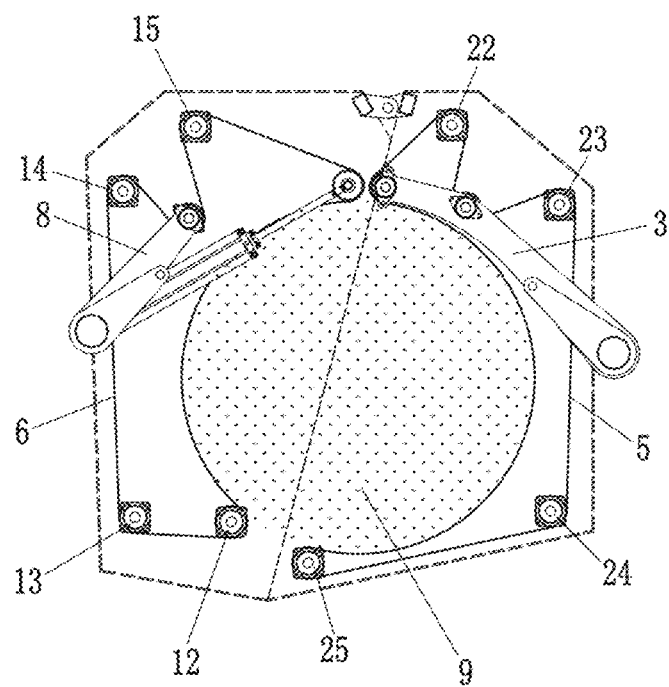
Figure 20:
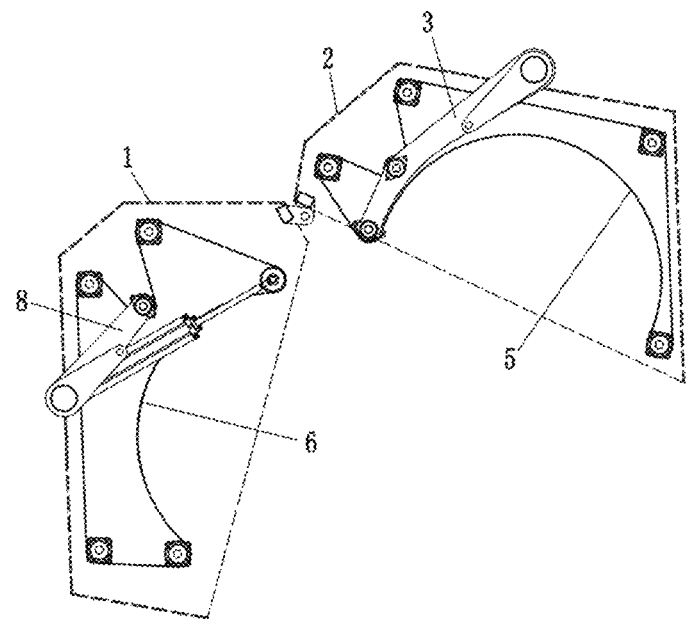
Figure 21:
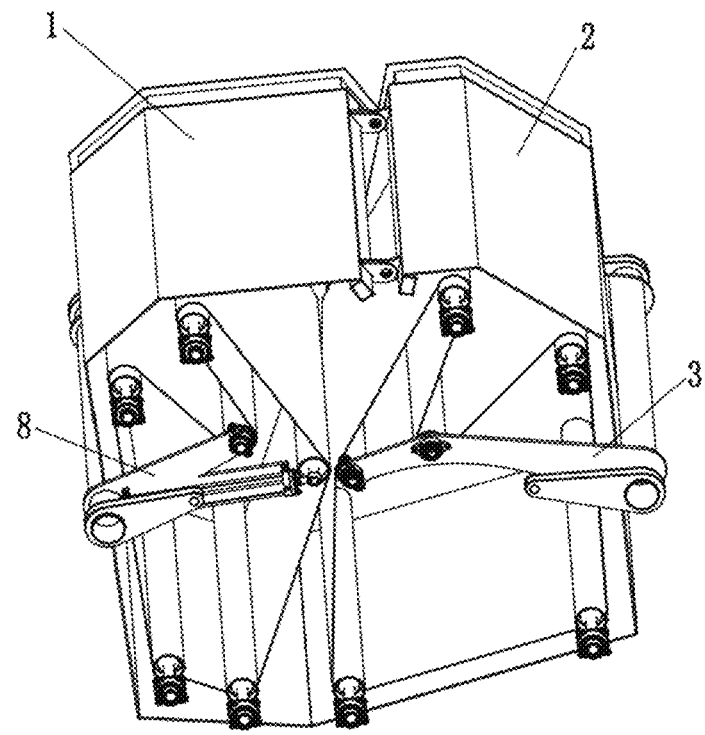
Figure 22:
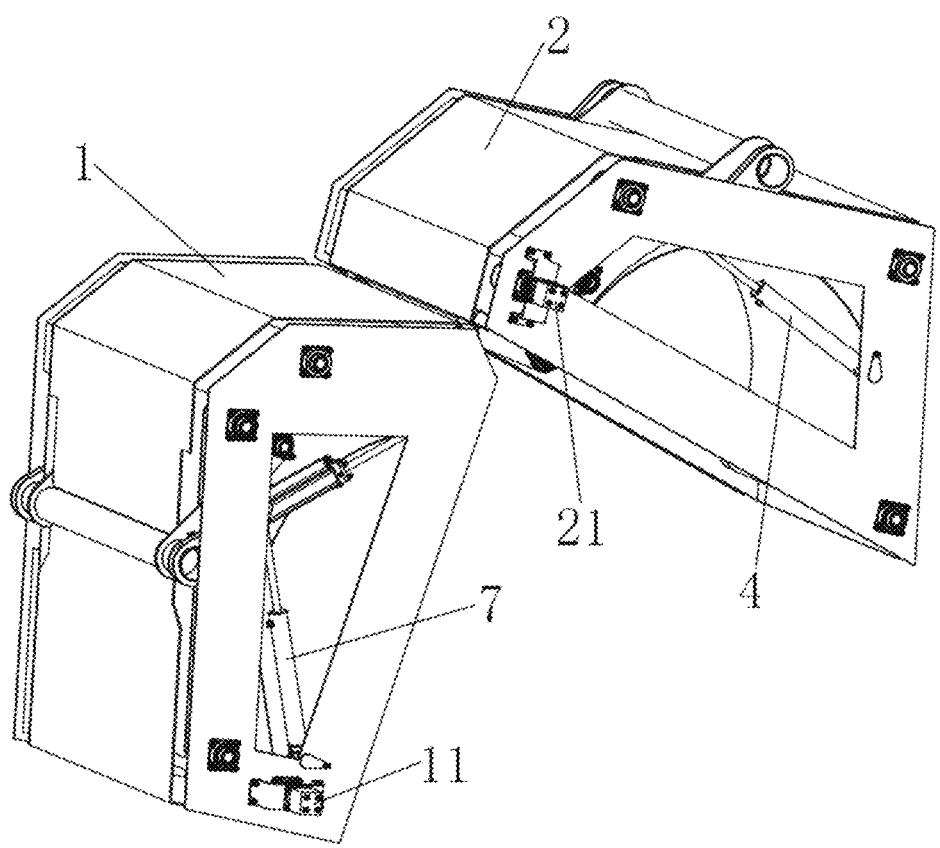
Figure 23:
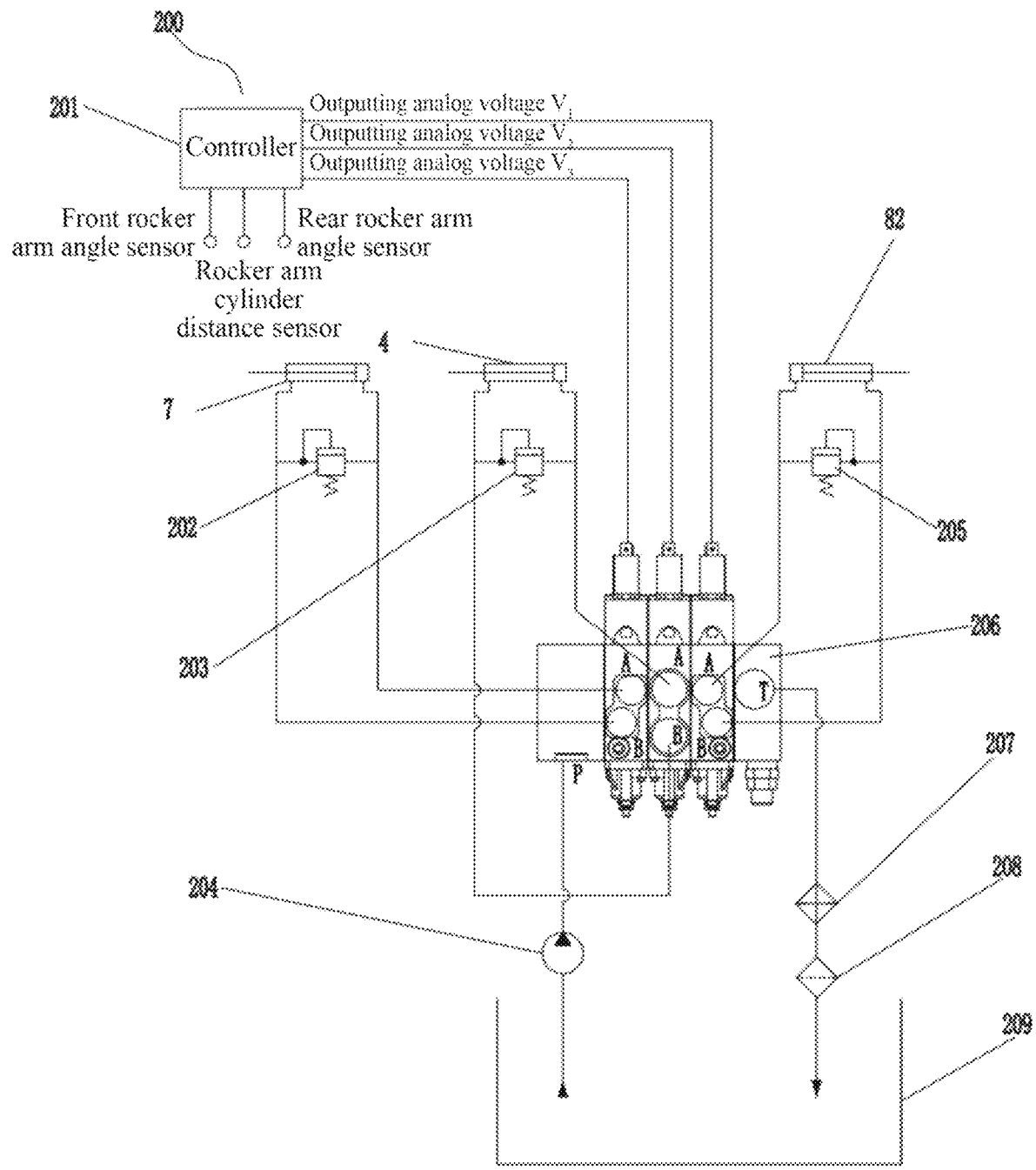

FIG. 14 is a structural schematic view of a baling mechanism of a cotton picker according to Embodiment III of the present disclosure;

FIG. 15 is a schematic view of an initial state of a baling mechanism of a cotton picker according to Embodiment III of the present disclosure;

FIG. 16 is a structural schematic view of a movable rocker arm of a baling mechanism of a cotton picker according to Embodiment III of the present disclosure;

FIG. 17 is a structural schematic view of a fixed rocker arm of a baling mechanism of a cotton picker according to Embodiment III of the present disclosure;

FIG. 18 is a schematic view of a winding form of a baling belt of a baling mechanism of a cotton picker according to Embodiment III of the present disclosure;

FIG. 19 is a schematic view of a baling process of a baling mechanism of a cotton picker according to Embodiment III of the present disclosure;

FIG. 20 is a schematic view of a bale unloading state of a baling mechanism of a cotton picker according to Embodiment III of the present disclosure;

FIG. 21 is a schematic view of an initial structure of a baling mechanism of a cotton picker according to Embodiment III of the present disclosure;

FIG. 22 is a structural schematic view of a bale unloading process of a baling mechanism of a cotton picker according to Embodiment III of the present disclosure;

FIG. 23 is a principle schematic view of hydraulic control of a baling mechanism of a cotton picker according to Embodiment III of the present disclosure;

Reference signs in FIG. 14 to FIG. 23 are as follows: 100, baling mechanism of cotton picker; 1, fixed box; 11, fixed motor; 12, first fixed guide roller; 13, second fixed guide roller; 14, third fixed guide roller; 15, fourth fixed guide roller; 2, movable box; 21, movable motor; 22, first movable guide roller; 23, second movable guide roller; 24, third movable guide roller; 25, fourth movable guide roller; 3, movable rocker arm; 31, first movable rocker arm roller; 32, second rocker arm roller; 33, movable side arm; 34, movable support arm; 35, movable rotating shaft; 4, movable rocker arm driving cylinder; 5, movable baling belt; 6, fixed baling belt; 7, fixed rocker arm driving cylinder; 8, fixed rocker arm; 81, first fixed rocker arm roller; 82, scaffolding cylinder; 83, fixed support arm; 84, fixed side arm; 85, fixed rotating shaft; 86, second fixed rocker arm roller; 9, cotton bale;

200, control system; 201, controller; 202, fixed cylinder overflow valve; 203, movable cylinder overflow valve; 204, hydraulic pump; 205, scaffolding cylinder overflow valve; 206, flow-sharing multi-way valve; 207, oil cooler; 208, oil filter; 209, fuel tank.

Figure 24:
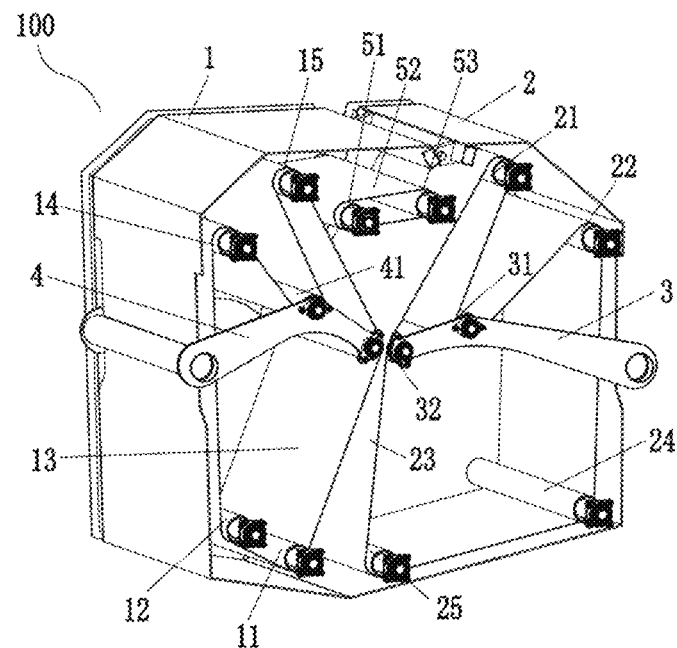
Figure 25:
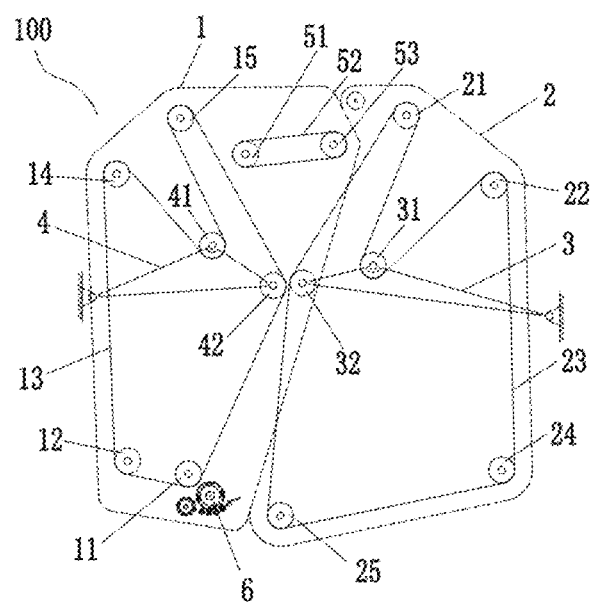
Figure 26:
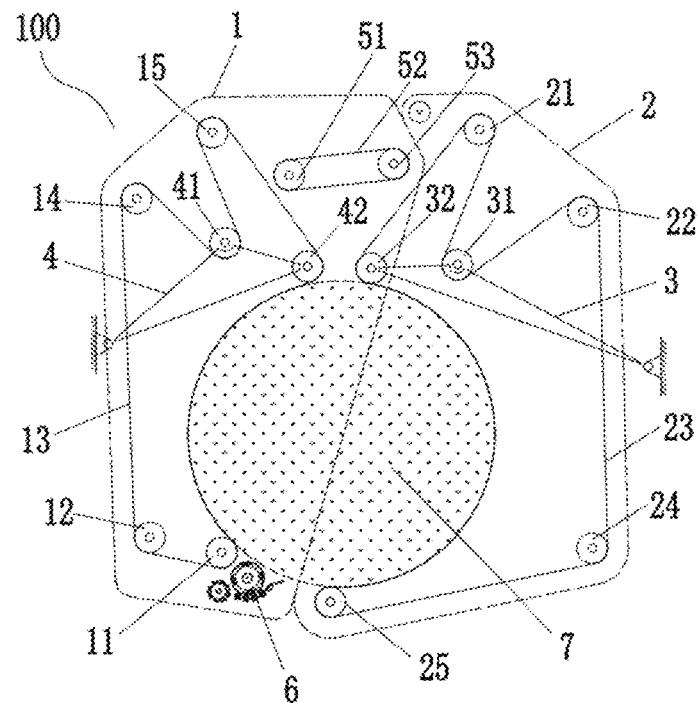
Figure 27:
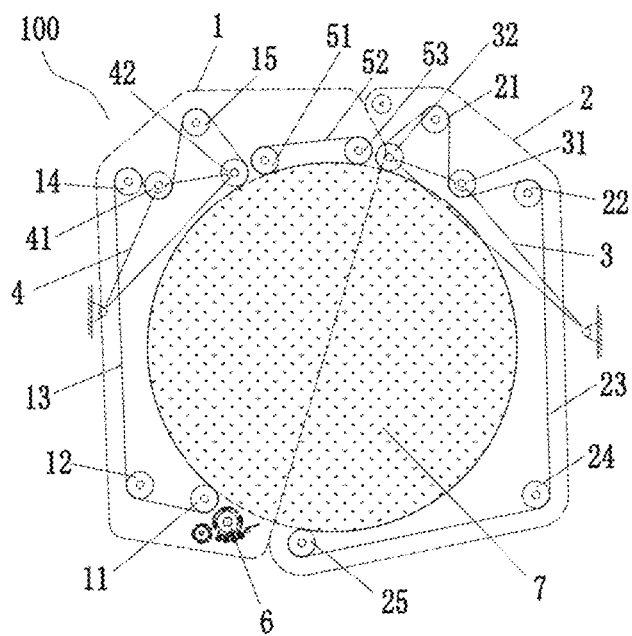
Figure 28:
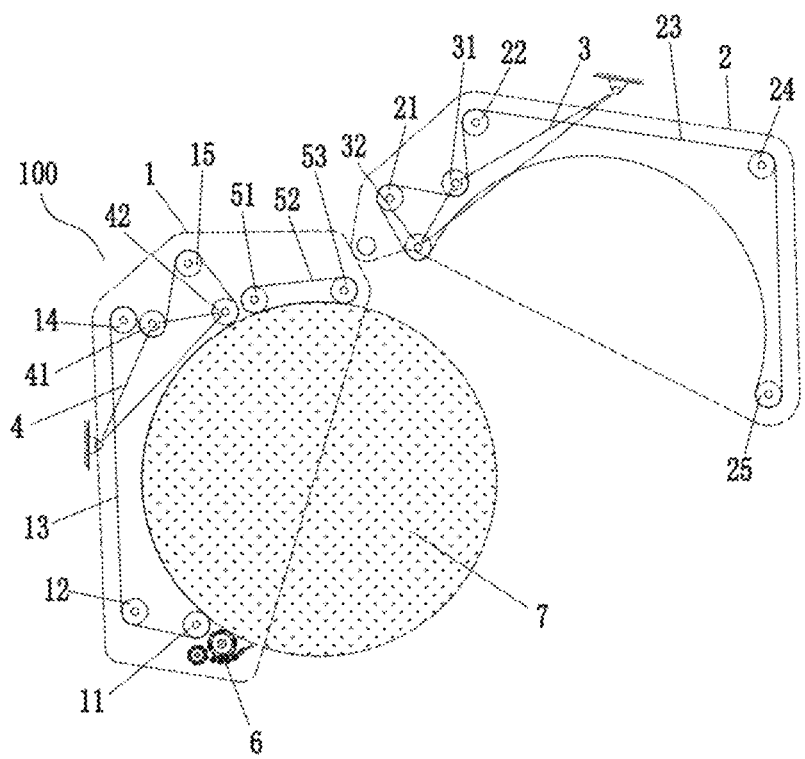
Figure 29:
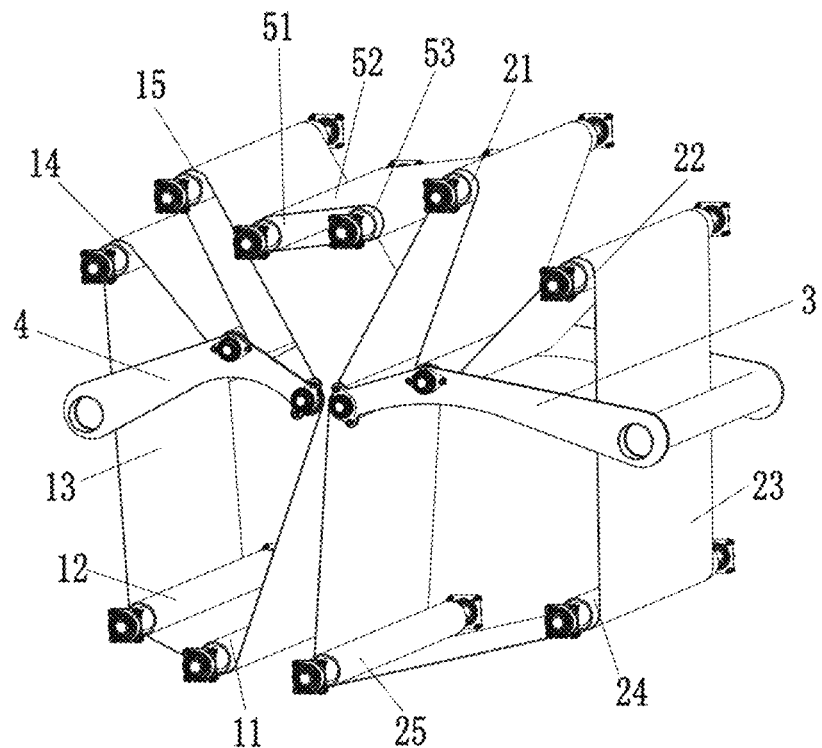
Figure 30:
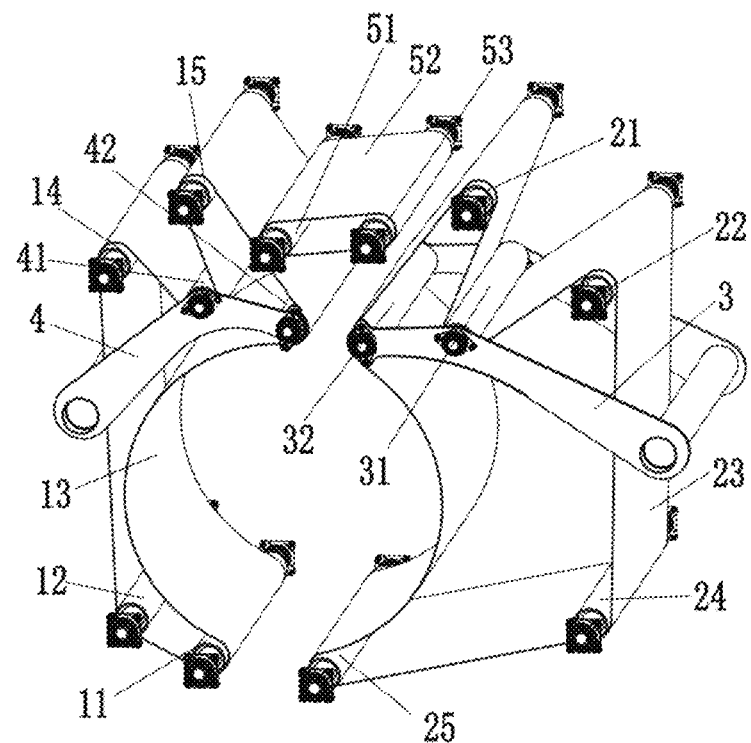
Figure 31:
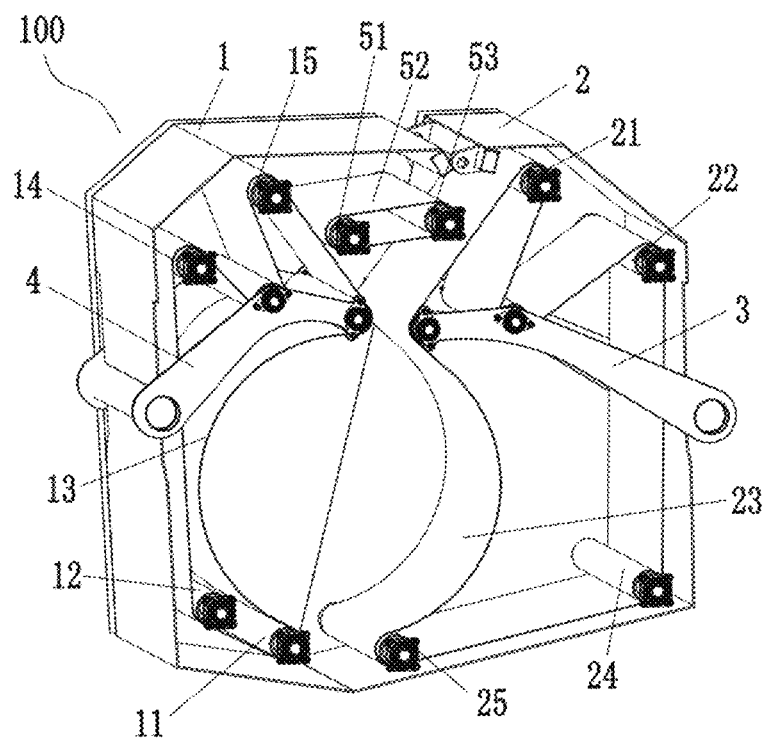
Figure 32:
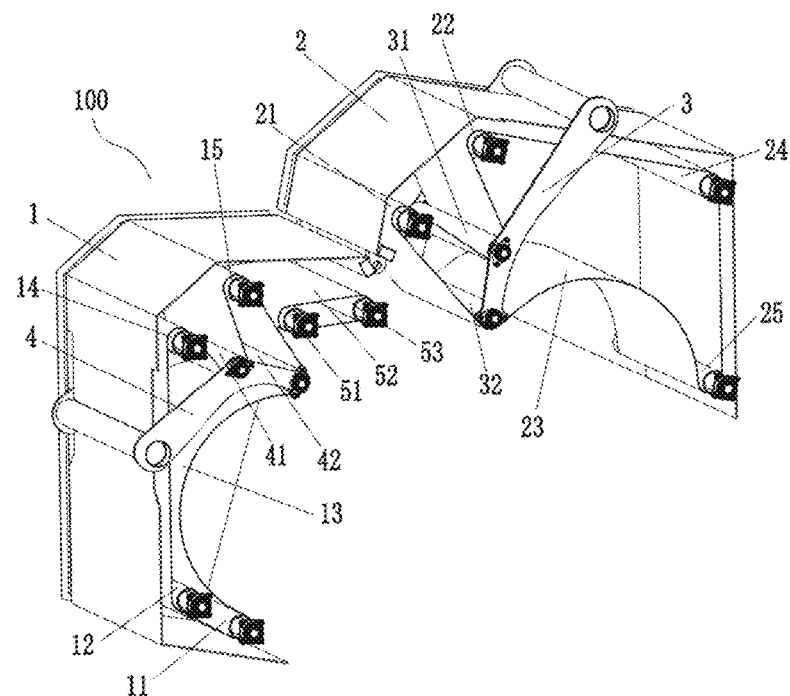
Figure 33:
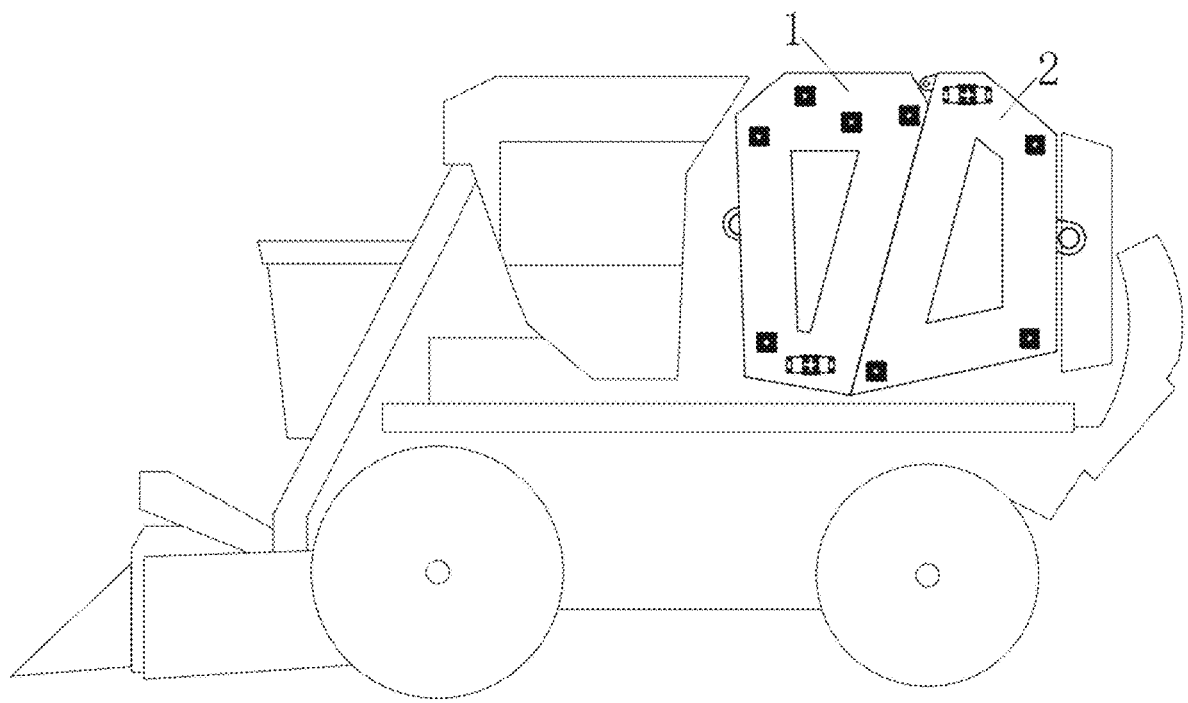
Figure 34:
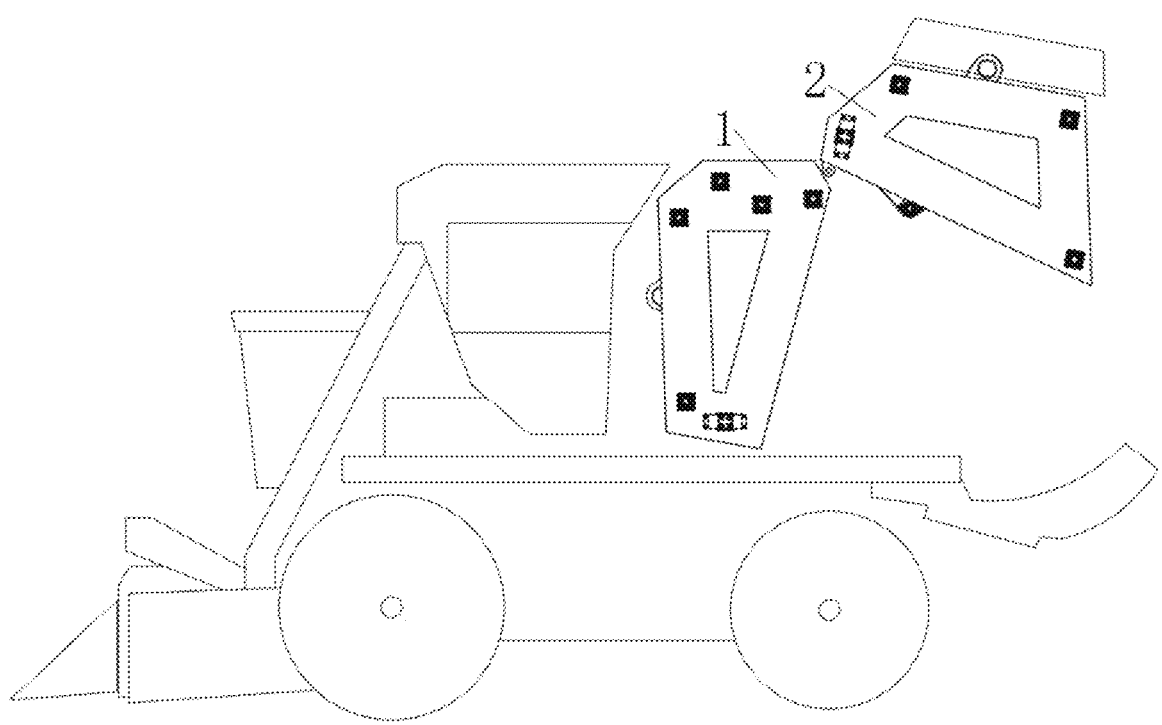
Figure 35:
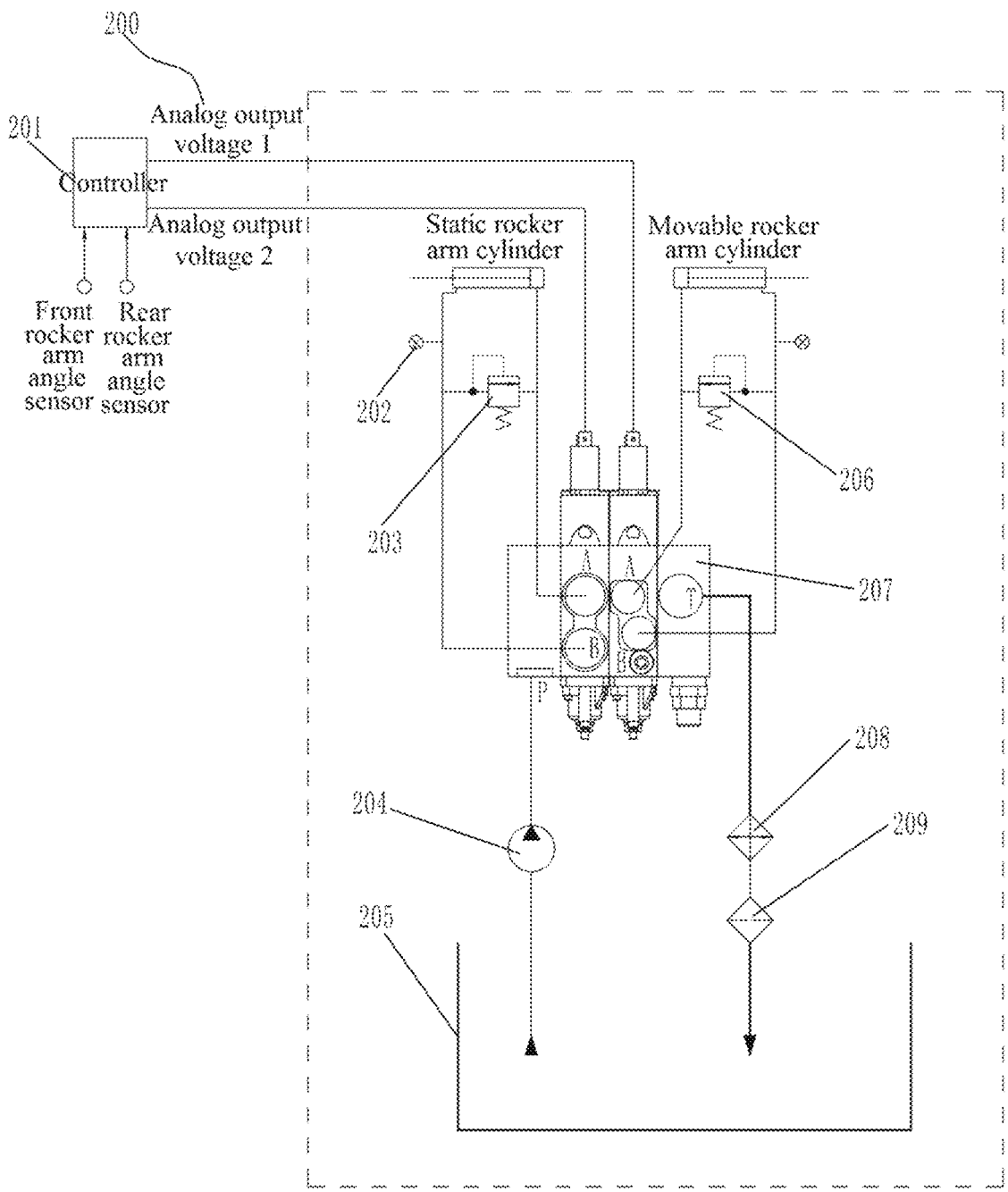

FIG. 24 is a structural schematic view of a baling mechanism of a cotton picker according to Embodiment IV of the present disclosure;

FIG. 25 is a principle schematic view of an initial state of a baling mechanism of a cotton picker according to Embodiment IV of the present disclosure;

FIG. 26 is a principle schematic view of a baling process of a baling mechanism of a cotton picker according to Embodiment IV of the present disclosure;

FIG. 27 is a principle schematic diagram of a full-bale state of a baling mechanism of a cotton picker according to Embodiment IV of the present disclosure;

FIG. 28 is a principle schematic diagram of bin opening and bale unloading of a baling mechanism of a cotton picker according to Embodiment IV of the present disclosure;

FIG. 29 is a schematic view of a baling belt of a baling mechanism in an initial state of a cotton picker according to Embodiment IV of the present disclosure;

FIG. 30 is a schematic view of a baling belt of a baling mechanism in a baling process of a cotton picker according to Embodiment IV of the present disclosure;

FIG. 31 is a structural schematic view of a baling process of a baling mechanism of a cotton picker according to Embodiment IV of the present disclosure;

FIG. 32 is a structural schematic view of bin opening and bale unloading of a baling mechanism of a cotton picker according to Embodiment IV of the present disclosure;

FIG. 33 is a schematic view of a baling mechanism of a cotton picker and a working state of the cotton picker according to Embodiment IV of the present disclosure;

FIG. 34 is a schematic view of a baling mechanism of a cotton picker and a bale unloading state of the cotton picker according to Embodiment IV of the present disclosure;

FIG. 35 is a principle diagram of a baling mechanism of a cotton picker and a hydraulic circuit of a control system thereof according to Embodiment IV of the present disclosure;

Reference signs in FIG. 24 to FIG. 35 are as follows: 100, baling mechanism; 1, fixed box; 11, first fixed guide roller; 12, second fixed guide roller; 13, fixed baling belt; 14, third fixed guide roller; 15, fourth fixed guide roller; 2, movable box; 21, first movable guide roller; 22, second movable guide roller; 23, movable baling belt; 24, third movable guide roller; 25, fourth movable guide roller; 3, movable rocker arm; 31, first movable rocker arm roller; 32, second movable rocker arm roller; 4, fixed rocker arm; 41, first fixed rocker arm roller; 42, second fixed rocker arm roller; 51, first driven roller; 52, limit baling belt; 53, second driven roller; 6, feeding device; 7, cotton bale; 200, control system; 201, controller; 202, pressure indicator; 203, overflow valve I; 204, gear pump; 205, fuel tank; 206, overflow valve II; 207, multi-way valve; 208, oil cooler; and 209, oil filter.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a baling mechanism of a cotton picker, and a control system of the baling mechanism, so as to solve the problems in the prior art, simplifying a structure of the baling mechanism, reducing the assembly and debugging difficulty of a baling system, and improving the uniformity and compactness of a cotton bale.

In order to make the objectives, features and advantages of the present disclosure more clear and understandable, the following further describes the present disclosure in detail with reference to the accompanying drawings and specific implementations.

Embodiment I

Referring to FIG. 1 to FIG. 12, a baling mechanism 100 of a cotton picker is provided in this embodiment, and includes a fixed box 1 and a movable box 2. The fixed box 1 is arranged on a frame of the cotton picker. A fixed rocker arm 101, a fixed rocker arm driving cylinder 102, a fixed roller system and a fixed baling belt 103 are arranged in the fixed box 1. One end of the fixed rocker arm 101 is rotatably connected to the fixed box 1, meanwhile, the fixed rocker arm 101 is hinged with the fixed rocker arm driving cylinder 102, and the fixed rocker arm driving cylinder 102 can drive the fixed rocker arm 101 to swing. The fixed roller system includes multiple fixed guide rollers which are rotatably arranged in the fixed box 1. The fixed rocker arm 101 is cooperated with the fixed guide roller to tension the fixed baling belt 103 and to drive the fixed baling belt 103 to rotate. The movable box 2 is hinged with the fixed box 1. A movable rocker arm 201, a movable rocker arm driving cylinder 202, a movable roller system and a movable baling belt 203 are arranged in the movable box 2. One end of the movable rocker arm 201 is rotatably connected to the movable box 2, and the movable rocker arm 201 is hinged with the movable rocker arm driving cylinder 202. The movable rocker arm driving cylinder 202 can drive the movable rocker arm 201 to swing, and a swing end of the movable rocker arm 201 is arranged close to a swing end of the fixed rocker arm 101. The movable roller system includes multiple movable guide rollers which are rotatably arranged in the movable box 2. The fixed rocker arm 101, the movable rocker arm 201 and the movable guide roller are in cooperation to tension the movable baling belt 203 and to drive the movable baling belt 203 to rotate. A cotton bale forming chamber is enclosed and formed by the fixed rocker arm 101, the fixed baling belt 103 and the movable baling belt 203. A bottom gap between the fixed baling belt 103 and the movable baling belt 203 forms a cotton feeding channel, and the cotton feeding channel is communicated with the cotton bale forming chamber. The fixed rocker arm 101 is driven by the fixed rocker arm driving cylinder 102 to swing, the movable rocker arm 201 is driven by the movable rocker arm driving cylinder 202 to swing, such that the volume of the cotton bale forming chamber can be increased to adapt to the increase of a rolled cotton bale 12.

According to the baling mechanism 100 of the cotton picker of the present disclosure, a cotton bale forming chamber is jointly enclosed and formed by the fixed baling belt 103 and the movable baling belt 203. When the baling mechanism works, as cotton is fed from the cotton feeding channel, the fixed rocker arm 101 swings counterclockwise, the movable rocker arm 201 swings clockwise, and the fixed baling belt 103 and the movable baling belt 203 rotate clockwise respectively, such that the movable rocker arm 201, the fixed rocker arm 101, the fixed baling belt 103 and the movable baling belt 203 jointly act on the cotton bale 12, and the cotton bale 12 is rolled and formed under the joint action of the fixed baling belt 103, the movable baling belt 203, the fixed roller system and the movable roller system, thus forming a round cotton bale 12 with uniform density. When the fixed rocker arm driving cylinder 102 and the movable rocker arm driving cylinder 202 reach a maximum stroke, the cotton bale 12 reaches a maximum diameter, the movable box 2 is flipped counterclockwise by a certain angle relative to the fixed box 1, and the cotton bale 12 is rolled and unloaded under the joint action of the own gravity and the tensile force of the fixed baling belt 103. The baling mechanism 100 of the cotton picker of the present disclosure is simple in structure and convenient to install. By adopting the form of a fixed baling belt 103 and a movable baling belt 203, the problems of fatigue failure caused by large amount of expansion and contraction variation of the baling belt and mounting and debugging difficulty of extremely long baling belt in the baling system in the prior art are solved, and the uniformity and compactness of the cotton bale 12 are effectively ensured.

In this embodiment, the fixed rocker arm 101 includes a fixed rocker arm articulated shaft 104, a first fixed rocker arm roller 105, a second fixed rocker arm roller 106, a third fixed rocker arm roller 107, a first fixed connecting rod 108, and a second fixed connecting rod 109. The fixed rocker arm articulated shaft 104 is hinged with the fixed box 1 to provide an installation foundation for the fixed rocker arm 101 and provide a swing rotating shaft for the swing of the fixed rocker arm 101. The first fixed connecting rod 108 is fixedly connected to the fixed rocker arm articulated shaft 104 and the second fixed connecting rod 109, the first fixed rocker arm roller 105 and the second fixed rocker arm roller 106 are rotatably arranged on the second fixed connecting rod 109, and located on one end, away from the first fixed connecting rod 108, of the second fixed connecting rod 109. The third fixed rocker arm roller 107 is arranged at a joint of the first fixed connecting rod 108 and the second fixed connecting rod 109, thus adapting to the increase of the cotton bale 12 while making the fixed rocker arm 101 swing. The fixed baling belt 103 and the movable baling belt 203 both pass between the first fixed rocker arm roller 105 and the second fixed rocker arm roller 106, the fixed baling belt 103 is abutted against the second fixed rocker arm roller 106 and the third fixed rocker arm roller 107. Specifically, the fixed baling belt 103 is in contact with an outer side of the second fixed rocker arm roller 106 and an inner side of the third fixed rocker arm roller 107, thus achieving the tensioning of the fixed baling belt 103. The movable baling belt 203 is abutted against the first fixed rocker arm roller 105. Specifically, the movable baling belt 203 is in contact with one side, close to the second fixed rocker arm roller 106, of the first fixed rocker arm roller 105.

In this specific implementation, two groups of the first fixed connecting rods 108 and two groups of the second fixed connecting rods 109 are provided, thus making the fixed rocker arm 101 form a frame structure. The fixed rocker arm 101 employs the frame structure, such that the stability of the fixed rocker arm can be effectively improved, and the working reliability of the baling mechanism 100 of the cotton picker is improved.

It also needs to be noted that the fixed rocker arm 101 further includes a fixed driving rod 110. One end of the fixed driving rod 110 is connected to the fixed rocker arm articulated shaft 104, and the other end of the fixed driving rod 110 is hinged with the fixed rocker arm driving cylinder 102. A fixed end of the fixed rocker arm driving cylinder 102 is hinged with the fixed box 1, and a movable end of the fixed rocker arm driving cylinder 102 is hinged with the fixed driving rod 110. The movable end of the fixed rocker arm driving cylinder 102 slides in a reciprocating manner to drive the fixed rocker arm 101 to rotate around the fixed rocker arm articulated shaft 104.

Figure 1:
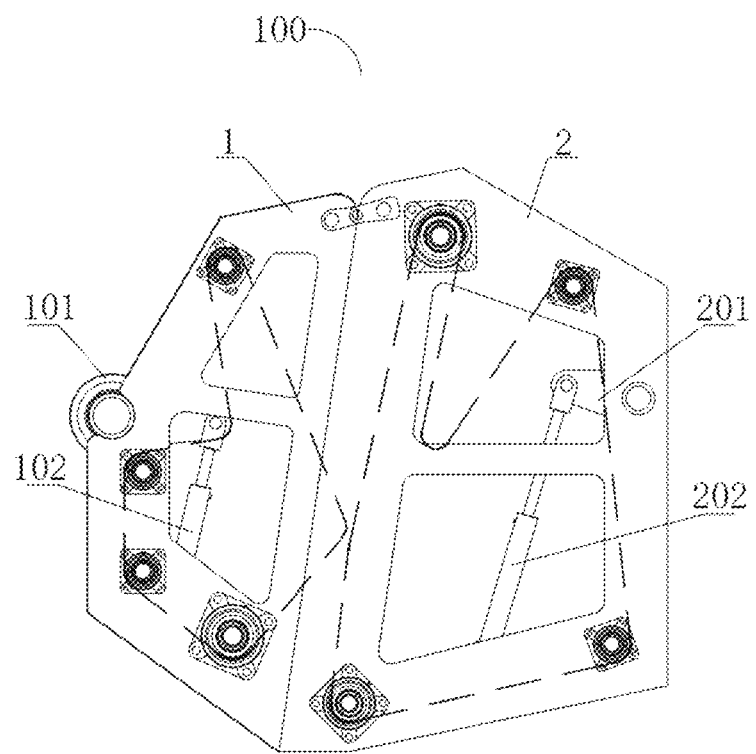
FIG. 1 is a structural schematic view of a baling mechanism of a cotton picker according to Embodiment I of the present disclosure.
Figure 2:
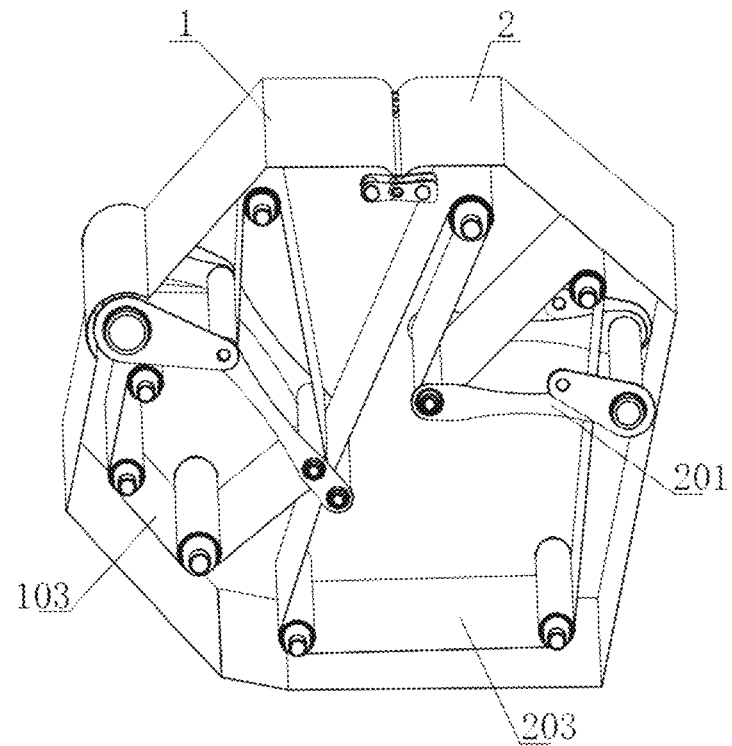
FIG. 2 is an isometric schematic view of a baling mechanism of a cotton picker according to Embodiment I of the present disclosure.
Figure 3:
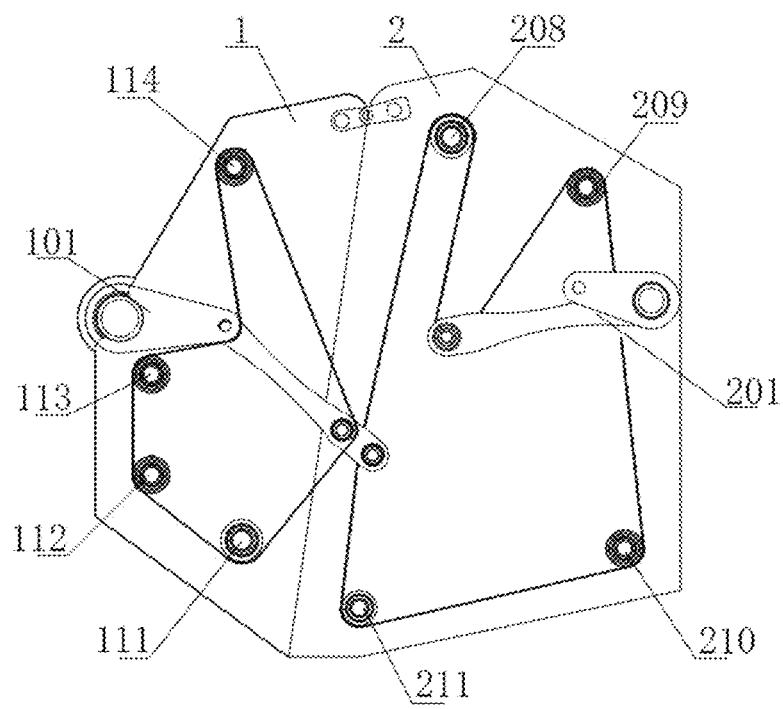
FIG. 3 is a schematic view of an initial position of a baling mechanism of a cotton picker according to Embodiment I of the present disclosure.
Figure 4:
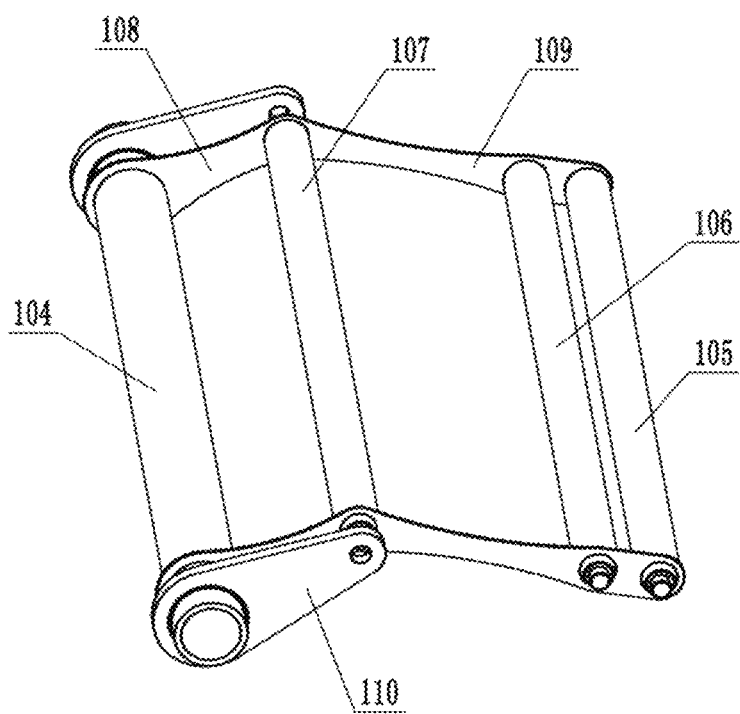
FIG. 4 is a structural schematic view of a fixed rocker arm of a baling mechanism of a cotton picker according to Embodiment I of the present disclosure.
Figure 5:
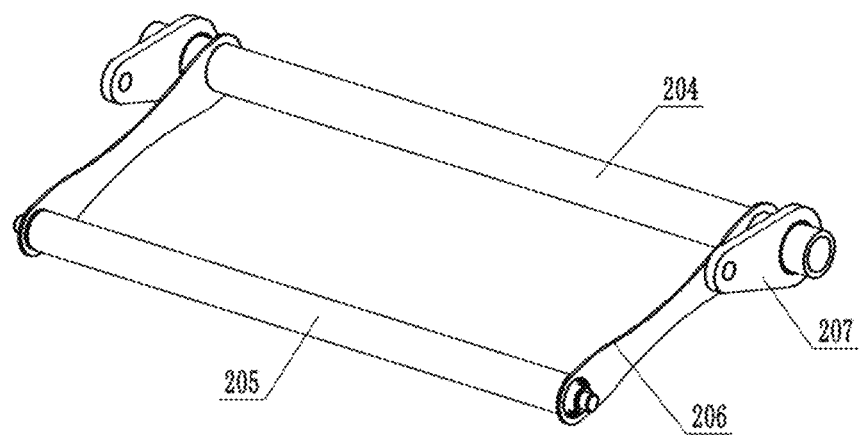
FIG. 5 is a structural schematic view of a movable rocker arm of a baling mechanism of a cotton picker according to Embodiment I of the present disclosure.
Figure 6:
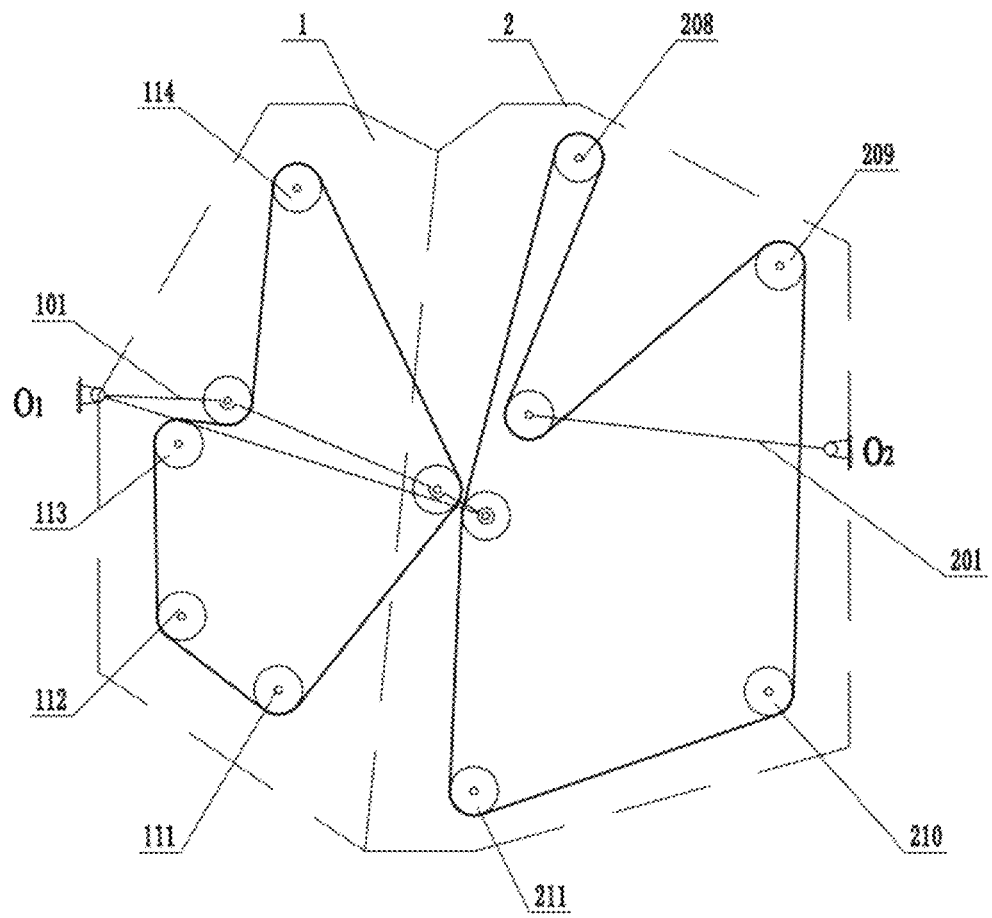
FIG. 6 is a simplified structural schematic view of an initial position of a baling mechanism of a cotton picker according to Embodiment I of the present disclosure.
Figure 7:
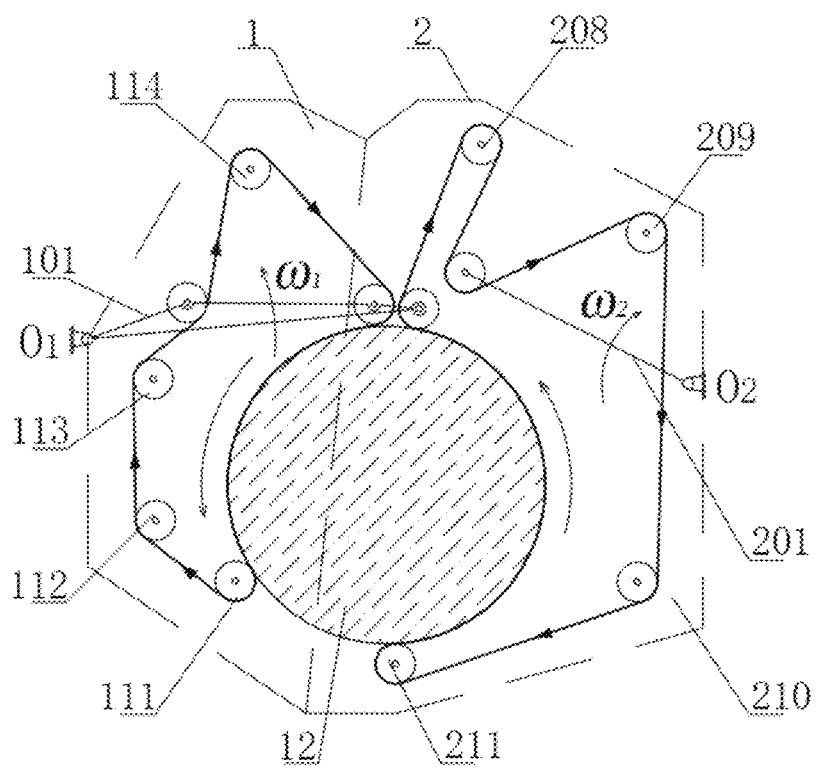
FIG. 7 is a schematic view of a baling principle of a baling mechanism of a cotton picker according to Embodiment I of the present disclosure.
Figure 8:
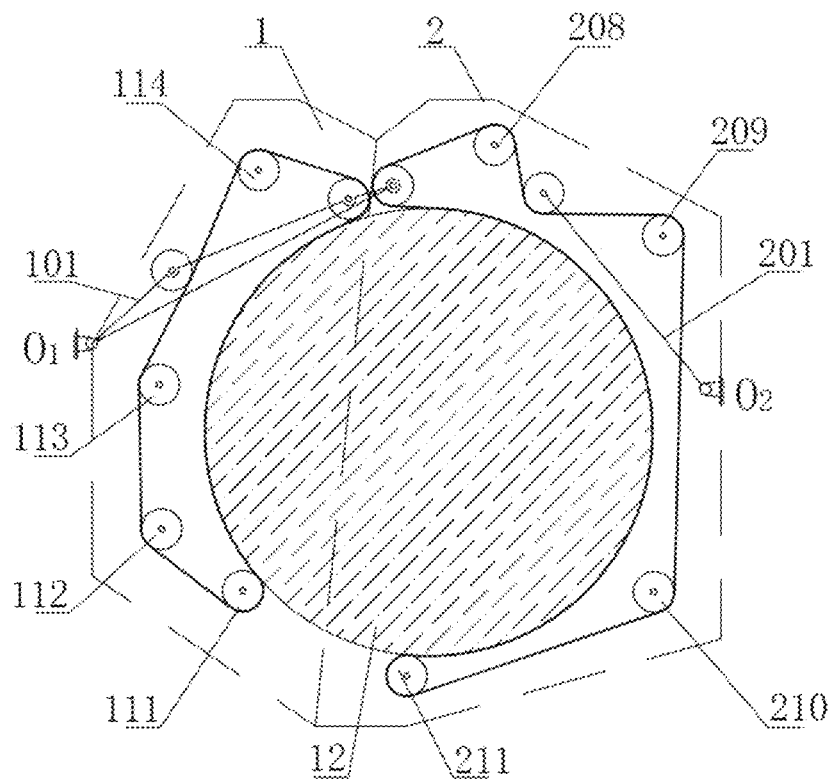
FIG. 8 is a schematic view of a baling termination of a baling mechanism of a cotton picker according to Embodiment I of the present disclosure.
Figure 9:
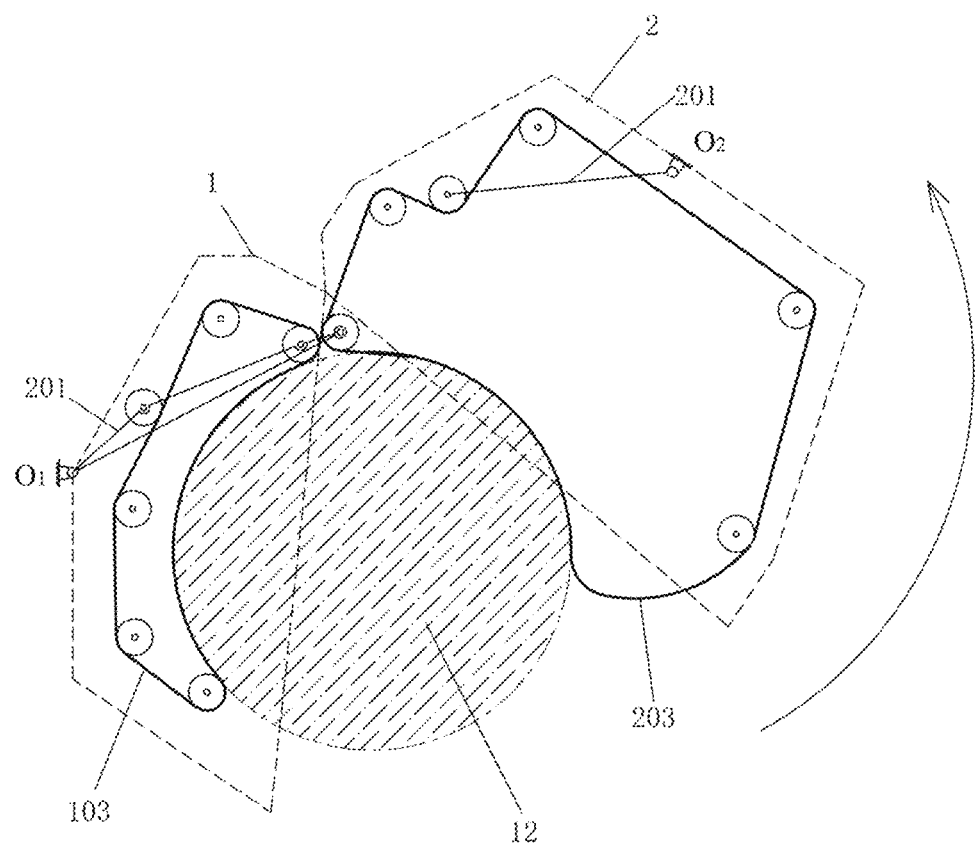
FIG. 9 is a schematic view of a box-opening process of a baling mechanism of a cotton picker according to Embodiment I of the present disclosure.
Figure 10:
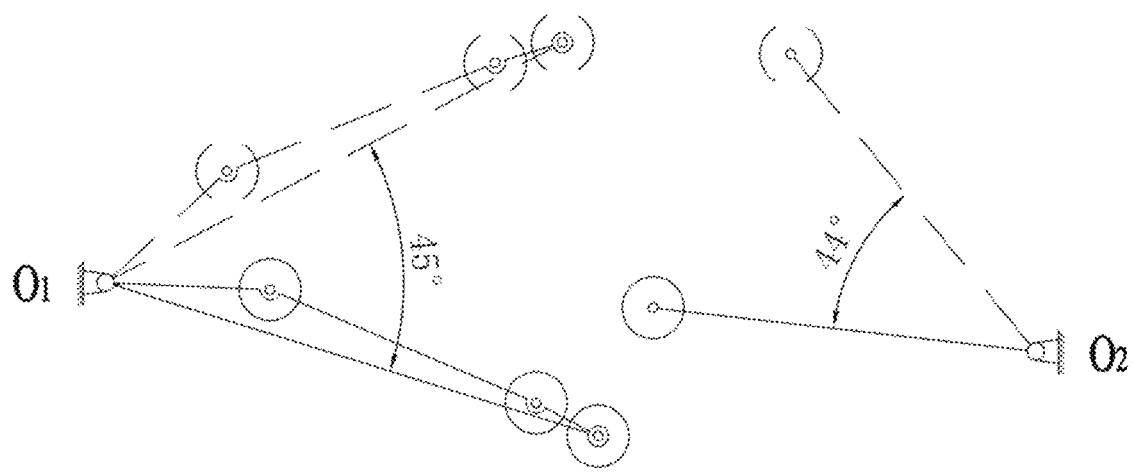
FIG. 10 is a schematic view of a movable rocker arm of a baling mechanism of a cotton picker according to Embodiment I of the present disclosure and a swing process of the movable rocker arm.

In this specific implementation, the fixed roller system includes a first fixed guide roller 111, a second fixed guide roller 112, a third fixed guide roller 113, and a fourth fixed guide roller 114 which are rotationally arranged in the fixed box, referring to FIG. 1 to FIG. 3 in detail. The fixed baling belt 103 is wound around the first fixed guide roller 111, the second fixed guide roller 112, the third fixed guide roller 113, the third fixed rocker arm roller 107, the fourth fixed guide roller 114 and the second fixed rocker arm roller 106 arranged in sequence. The first fixed guide roller 111, the second fixed guide roller 112 and the third fixed guide roller 113 are located below the fixed rocker arm 101, and the fourth fixed guide roller 114 is located above the fixed rocker arm 101, such that the fixed baling belt 103 and the movable baling belt 203 can be enclosed to form a cotton bale forming chamber, and the function of guiding the fixed baling belt 103 and tensioning the fixed baling belt 103 is achieved. In other specific implementation of the present disclosure, the number and arrangement of the fixed guide rollers can be adjusted according to the shape and specification of the baling mechanism 100 of the cotton picker and specific baling demands, so as to satisfy different working conditions. It also needs to be noted that, in practical application, one of the fixed guide rollers is selected as a driving roller to ensure the normal rotation of the fixed baling belt 103.

Specifically, the movable rocker arm 201 includes a movable rocker arm articulated shaft 204, a movable rocker arm roller 205, and a movable connecting rod 206. The movable rocker arm articulated shaft 204 is rotatably connected to the movable box 2, one end of the movable connecting rod 206 is fixedly connected to the movable rocker arm articulated shaft 204, the other end of the movable connecting rod 206 is hinged with the movable rocker arm roller 205, and the movable baling belt 203 is abutted against the movable rocker arm roller 205. Like the structure of the fixed rocker arm 101, the movable rocker arm 201 employs a one-section structure, and the movable rocker arm articulated shaft 204 rotates, thus driving the movable connecting rod 206 and the movable rocker arm roller 205 to swing to make the movable baling belt 203 adapt to the increase of the cotton bale 12.

Similarly, the movable rocker arm 201 also employs a frame structure, and two groups of the movable connecting rods 206 are provided. The two movable connecting rods 206 are arranged at two axial ends of the movable rocker arm articulated shaft 204 and the movable rocker arm roller 205, thus making the movable rocker arm 201 form a frame structure to improve structural stability and motion reliability of the movable rocker arm 201.

Correspondingly, the movable rocker arm 201 further includes a movable driving rod 207. One end of the movable driving rod 207 is connected to the movable rocker arm articulated shaft 204, and the other end of the movable driving rod 207 is hinged with the movable rocker arm driving cylinder 202. A fixed end of the movable rocker arm driving cylinder 202 is hinged with the movable box 2, and a free end of the movable rocker arm driving cylinder 202 is hinged with the movable driving rod 207. The free end of the movable rocker arm driving cylinder 202 extends and retracts to drive the movable driving rod 207 and the movable rocker arm articulated shaft 204 to rotate, thus driving the movable driving rod 207 to swing.

In this specific implementation, the movable roller system includes a first movable guide roller 208, a second movable guide roller 209, a third movable guide roller 210, and a fourth movable guide roller 211 which are rotationally arranged in the movable box 2, referring to FIG. 1 to FIG. 3. The movable baling belt 203 is wound around the first movable guide roller 208, the movable rocker arm roller 205, the second movable guide roller 209, the third movable guide roller 210, the fourth movable guide roller 211 and the first fixed rocker arm roller 105 arranged in sequence. The first movable guide roller 208 and the second movable guide roller 209 are located above the movable rocker arm 201, the third movable guide roller 210 and the fourth movable guide roller 211 are located below the movable rocker arm 201, such that a cotton bale forming chamber can be enclosed and formed by the movable baling belt 203 and the fixed baling belt 103, and the movable baling belt 203 can be tensioned. In other specific implementations of the present disclosure, the number and arrangement of the movable guide rollers can be adjusted according to the shape and specification of the baling mechanism 100 of the cotton picker and specific baling demands, so as to satisfy different working conditions. It also needs to be noted that, in practical application, one of the movable guide rollers is selected as a driving roller to ensure the normal rotation of the movable baling belt 203.

Figure 11:
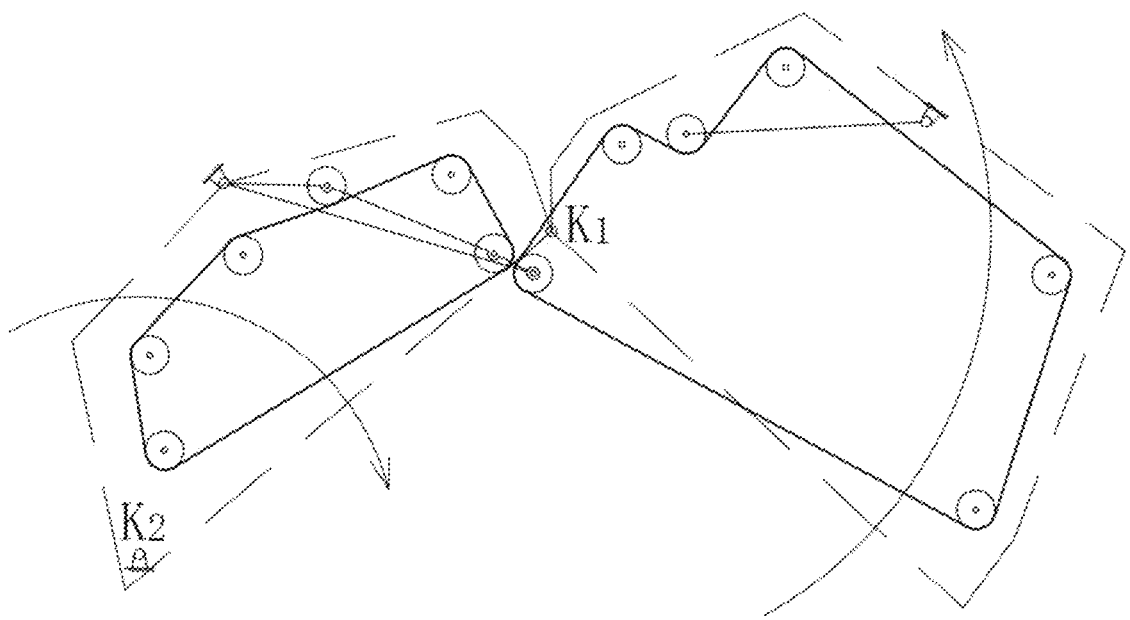
FIG. 11 is a schematic view of a transportation state of a baling mechanism of a cotton picker according to Embodiment I of the present disclosure.
Figure 12:
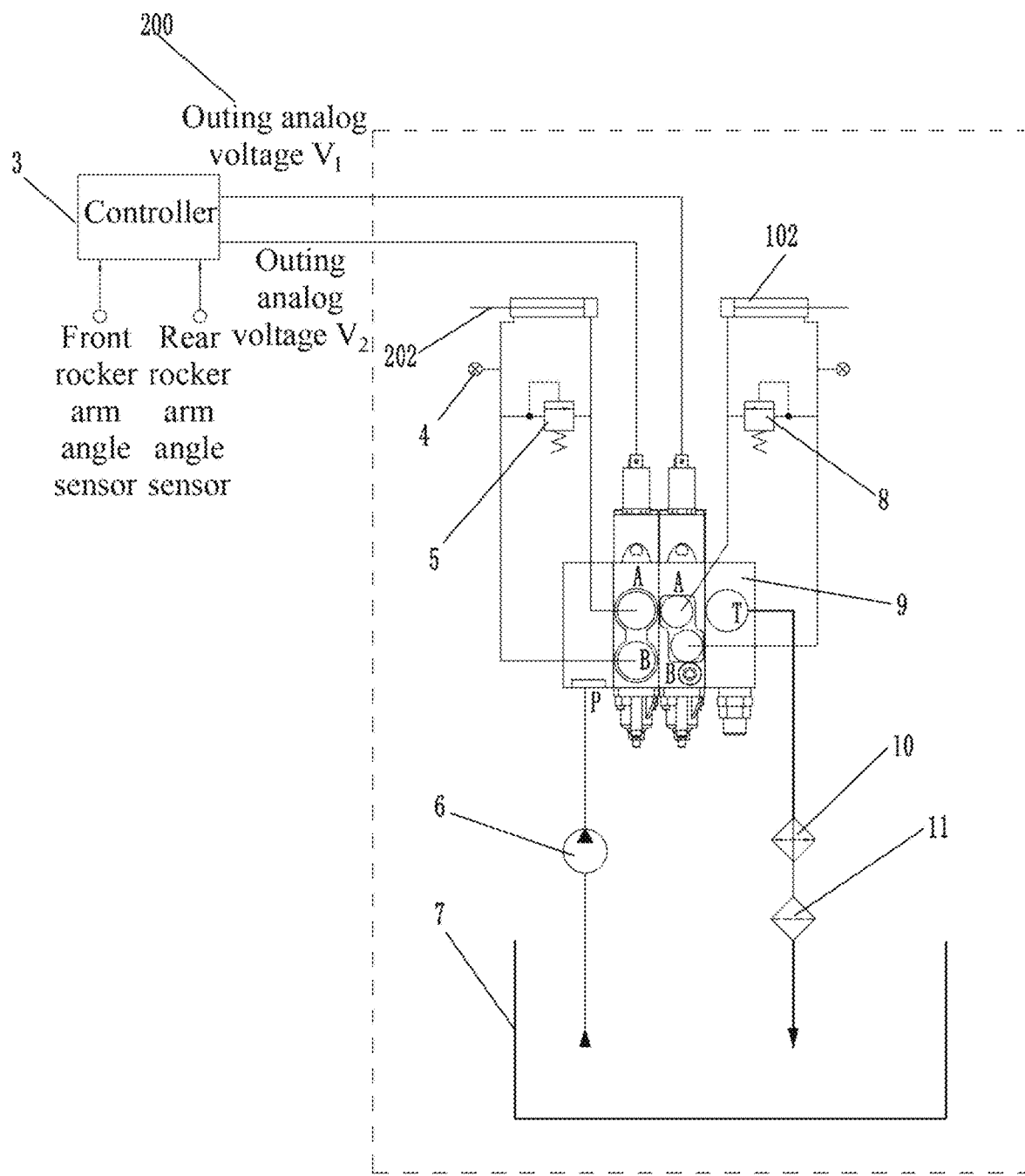
FIG. 12 is a principle schematic view of a control system of a baling mechanism of a cotton picker according to Embodiment I of the present disclosure.

More specifically, the fixed box 1 is hinged with the frame of the cotton picker, a hinge point of the fixed box 1 and the frame of the cotton picker is away from a hinge point of the fixed box 1 and the movable box 2. When the cotton picker is transported, as shown in FIG. 11, the movable box 2 is flipped counterclockwise by a certain angle around point $K_1$, and the fixed box 1 is flipped clockwise by a certain angle around a hinge point $K_2$ of the fixed box with the frame of the cotton picker, such that the baling mechanism 100 of the cotton picker is in a transportation state, the height limit conditions of highway are satisfied, and the adaptability of the baling mechanism 100 of the cotton picker is further improved.

In addition, angle sensors are arranged at the fixed box 1 and the movable box 2 to monitor swing angles of the fixed rocker arm 101 and the movable rocker arm 201. The angle sensors are connected to the fixed rocker arm 101 and the movable rocker arm 201 through a parallelogram mechanism, thus monitoring the swing angles of the fixed rocker arm 101 and the movable rocker arm 201. In this specific implementation, as the cotton bale 12 is gradually compressed into a roll and becomes larger, when the fixed rocker arm driving cylinder 102 and the movable rocker arm driving cylinder 202 simultaneously reach the maximum stroke, the maximum swing angle of the fixed rocker arm 101 is 45° and the maximum swing angle of the movable rocker arm 201 is 44°, and the cotton bale 12 reaches a predetermined diameter. In addition, in this specific implementation, the swing angles of the fixed rocker arm 101 and the movable rocker arm 201 detected by the angle sensors can be transmitted to a control system 200, such that the control system 200 can control the change of flow rates of the fixed rocker arm driving cylinder 102 and the movable rocker arm driving cylinder 202 conveniently, thus ensuring that the fixed baling belt 103 and the movable baling belt 203 are always tensioned in the baling and box closing process.

Embodiment II

Figure 13:
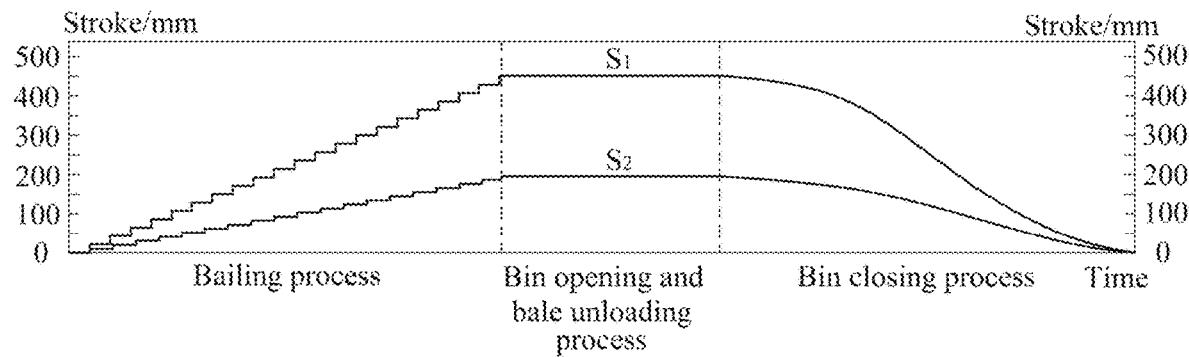
FIG. 13 is a schematic view of stroke changes of a fixed rocker arm driving cylinder and a movable rocker arm driving cylinder of a baling mechanism of a cotton picker according to Embodiment II of the present disclosure in a working cycle.

A control system 200 of a baling mechanism of a cotton picker in Embodiment 1 is provided in this embodiment, referring to FIG. 13, both a fixed rocker arm driving cylinder 102 and a movable rocker arm driving cylinder 202 are communicated with a fuel tank 7 of the cotton picker by applying multi-way valves 9, the fixed rocker arm driving cylinder 102 is connected in parallel with a first overflow valve 5, and the movable rocker arm driving cylinder 202 is connected in parallel with a second overflow valve 8. An oil circuit of the baling mechanism may be connected to the fuel tank 7 of the cotton picker, thus facilitating the control and the simplification of the structure of the cotton picker. In practical application, pressure indicators 4 are arranged on the oil circuits where the fixed rocker arm driving cylinder 102 and the movable rocker arm driving cylinder 202 are located. A gear pump 6 is arranged on an oil outlet circuit of the fuel tank 7, and an oil cooler 10 and an oil filter 11 are arranged on an oil return circuit.

The control system 200 of the baling mechanism of a cotton picker includes the following working processes:

Baling process: a cotton bale forming chamber is in a empty state, the multi-way valve 9 is used to control flow rates of oil circuits where the fixed rocker arm driving cylinder 102 and the movable rocker arm driving cylinder 202 are located, and the first overflow valve 5 and the second overflow valve 8 are used to restrain tensile force of a fixed baling belt 103 and a movable baling belt 203, thus determining a baling density of a cotton bale 12.

Bin opening and bale unloading process: when the fixed rocker arm driving cylinder 102 and the movable rocker arm driving cylinder 202 reach a maximum stroke, the baling process is finished, the multi-way valve 9 is switched to a non-working position, and both the fixed rocker arm driving cylinder 102 and the movable rocker arm driving cylinder 202 are in a locked state, such that a movable box 2 can rotate smoothly to open a bin and unload the bale.

Bin closing process: after the bin is opened for unloading the bale, a fixed baling belt 103 and a movable baling belt 203 are in a loosening state, the multi-way valve 9 is switched to a working position to control the flow rates of oil circuits where the fixed rocker arm driving cylinder 102 and the movable rocker arm driving cylinder 202 are located, the fixed rocker arm driving cylinder 102 and the movable rocker arm driving cylinder 202 are reset to close the bin, and after the bin is closed, the movable box 2 returns to an original state thereof.

The control system 200 of the baling mechanism of the cotton picker provided in the present disclosure can adjust the working state of the control system 200 according to specific baling demands, so as to satisfy different working conditions.

In this embodiment, the baling mechanism 100 of the cotton picker and the control system 200 thereof include three stages in one working cycle, a baling process, a bin opening and bale unloading process, and a box closing process. A complete working cycle in time sequence is as follows:

Baling process: in an initial state, the cotton bale forming chamber is in a empty state, seed cotton is fed from a channel between a first fixed guide roller 111 and a fourth movable guide roller 211. Meanwhile, a first movable guide roller 208 and a first fixed guide roller 111 which are used as driving rollers start to operate. Meanwhile, the gear pump 6 of the control system 200 starts to work, oil liquid enters port P of the multi-way valve 9 through the gear pump 6, and the multi-way valve 9 controls two-way flow rates according to a preset proportion. In this process, the first overflow valve 5 and the second overflow valve 8 are used to restrain the tensile force of the fixed baling belt 103 and the movable baling belt 203, respectively (a set pressure of the first overflow valve 5 is greater than that of the second overflow valve 8), thus determining the baling density of the cotton bale 12. The pressure indicator 14 can transmit oil pressure signals in the fixed rocker arm driving cylinder 102 and the movable rocker arm driving cylinder 202 to a cab of the cotton picker, and a driver can determine whether the baling is abnormal or not according to oil pressure change conditions.

Bin opening and bale unloading process: when the fixed rocker arm driving cylinder 102 and the movable rocker arm driving cylinder 202 reach the maximum stroke, the baling process is finished, and the multi-way valve 9 is switched to a neutral position (port P is used for oil inlet, port T is used for oil outlet, and the oil is returned through the oil cooler 10 and the oil filter 11). The fixed rocker arm driving cylinder 102 and the movable rocker arm driving cylinder 202 are both in a locked state, thus ensuring smooth bin opening and bale unloading of the movable box 2.

Bin closing process: after the bin is opened for bale unloading, the fixed baling belt 103 and the movable baling belt 203 are both in a loosening state, and the multi-way switch 9 is switched to a working station when the bin is closed. To make the baling belt in a tightening state during the bin closing process, a controller 3 outputs continuous analog voltage signals $V_1$ and $V_2$ to the multi-way valve 9 to control the flow rates of two oil circuits of the multi-way valve 9 (the oil circuit where the fixed rocker arm driving cylinder 102 is located and the oil circuit where the movable rocker arm driving cylinder 202 is located) according to the signal variation law, such that the flow rates of the two oil circuits can continuously change at a non-uniform speed according to a predetermined voltage signal, and then the stroke $S_2(t)$ of the fixed rocker arm driving cylinder 102 and the stroke $S_1(t)$ of the movable rocker arm driving cylinder 202 are controlled to continuously change at a non-uniform speed according to the predetermined law. After the bin is closed, the movable box 2 is in an initial state, and piston rods of the fixed rocker arm driving cylinder 102 and the movable rocker arm driving cylinder 202 are completely retracted.

According to the baling mechanism 100 of the cotton picker and the control system 200 thereof, when the baling mechanism works, as the cotton is fed, the fixed rocker arm 101 swings counterclockwise, the movable rocker arm 201 swings clockwise, and the fixed baling belt 103 and the movable baling belt 203 rotate clockwise respectively. The movable rocker arm 201, the fixed rocker arm 101, the fixed baling belt 103 and the movable baling belt 203 jointly act on a cotton bale 12, thus making the cotton bale form a round cotton bale 12 with uniform density. According to the present disclosure, the multi-way valve 9 is used to control the flow rate distribution, thus achieving the independent control of the fixed rocker arm driving cylinder 102 and the movable rocker arm driving cylinder 202, and the independent work of the movable baling belt 203 and the fixed baling belt 103. Compared with the baling system with one baling belt in the prior art, the amount of expansion and retraction variation of the baling belt can be reduced during baling, the service life of the baling belt can be prolonged, and the density uniformity of the cotton bale 12 can be effectively guaranteed.

Embodiment III

A baling mechanism 100 of a cotton picker in this embodiment includes a fixed box 1 and a movable box 2. The fixed box 1 is arranged on a frame of the cotton picker. A fixed rocker arm 8, a fixed rocker arm driving cylinder 7, a fixed roller system and a fixed baling belt 6 are arranged in the fixed box 1. One end of the fixed rocker arm 8 is rotatably connected to the fixed box 1, the other end of the fixed rocker arm 8 is hinged with the fixed rocker arm driving cylinder 7, and the fixed rocker arm driving cylinder 7 can drive the fixed rocker arm 8 to swing. The fixed roller system includes multiple fixed guide rollers, and the fixed guide rollers are rotatably arranged in the fixed box 1. The fixed rocker arm 8 and the fixed guide roller are in cooperation to tension a fixed baling belt 6 and to drive the fixed baling belt 6 to rotate. The movable box 2 is hinged with the fixed box 1. A movable rocker arm 3, a movable rocker arm driving cylinder 4, a movable roller system and a movable baling belt 5 are arranged in the movable box 2. One end of the movable rocker arm 3 is rotatably connected to the movable box 2, and the other end of the movable rocker arm 3 is hinged with the movable rocker arm driving cylinder 4. The movable rocker arm driving cylinder 4 can drive the movable rocker arm 3 to swing, and a swing end of the movable rocker arm 3 is arranged close to a swing end of the fixed rocker arm 8. The movable roller system includes multiple movable guide rollers, and the movable guide rollers are rotatably arranged in the movable box 2. The movable rocker arm 3 and the movable guide roller are in cooperation to tension a movable baling belt 5 and to drive the movable baling belt 5 to rotate. A cotton bale forming chamber is jointly enclosed and formed by the fixed baling belt 6 and the movable baling belt 5. A cotton feeding channel is formed by the bottom gap between the fixed baling belt 6 and the movable baling belt 5, and the cotton feeding channel is communicated with the cotton bale forming chamber. The fixed rocker arm driving cylinder 7 drives the fixed rocker arm 8 to swing, the movable rocker arm driving cylinder 4 drives the movable rocker arm 3 to swing, such that the volume of the cotton bale forming chamber can be increased to adapt to the increase of a rolled cotton bale 9.

The baling mechanism 100 of the cotton picker in this embodiment also employs a form of the fixed baling belt 6 and the movable baling belt 5. The fixed baling belt 6 and the movable baling belt 5 are respectively controlled by the swing of the movable rocker arm 3 and the fixed rocker arm 8 to control the winding shape, and the cotton bale forming chamber is gradually expanded during the forming of the cotton bale 9 to ensure the density consistency of the cotton bale 9.

In this embodiment, the fixed rocker arm 8 includes a first fixed rocker arm roller 81, a scaffolding cylinder 82, a fixed support arm 83, a fixed side arm 84, a fixed rotating shaft 85, and a second fixed rocker arm roller 86. The fixed rotating shaft 85 is rotatably arranged in the fixed box 1, one end of the fixed support arm 83 and one end of the fixed side arm 84 are both fixed to the fixed rotating shaft 85, the other end of the fixed support arm 83 is hinged with the fixed rocker arm driving cylinder 7, and the other end of the fixed side arm 84 is hinged with the second fixed rocker arm roller 86. A fixed end of the scaffolding cylinder 82 is fixed to the fixed side wall 84, and a free end of the scaffolding cylinder 82 is hinged with the first fixed rocker arm roller 81. The fixed baling belt 6 bypasses the first fixed rocker arm roller 81 and the second fixed rocker arm roller 86. The fixed rocker arm driving cylinder 7 pushes the fixed rocker arm 8 to rotate counterclockwise, and the movable rocker arm driving cylinder 4 pushes the movable rocker arm 3 to rotate clockwise. Meanwhile, the scaffolding cylinder 82 pushes the first fixed rocker arm roller 81 to move, and the cotton bale forming chamber is changed accordingly. Two groups of the fixed support arms 83, two groups of the fixed side arms 84 and two groups of the scaffolding cylinders 82 are provided, thus making the fixed rocker arm 8 form a frame structure to improve the motion stability of the fixed rocker arm 8.

Correspondingly, the movable rocker arm 3 includes a first movable rocker arm roller 31, a second movable rocker arm roller 32, a movable side arm 33, a movable support arm 34, and a movable rotating shaft 35. The movable rotating shaft 35 is rotatably arranged in the movable box 2, one end of the movable side arm 33 and one end of the movable support arm 34 are fixed to the movable rotating shaft 35, and the other end of the movable support arm 34 is hinged with the movable rocker arm driving cylinder 4. The first movable rocker arm roller 31 and the second movable rocker arm roller 32 are both hinged with the other end of the movable side arm 33. The movable baling belt 5 bypasses the first movable rocker arm roller 31 and the second movable rocker arm roller 32. Two groups of the movable side arms 33 and two groups of the movable support arms 34 are provided, thus making the movable rocker arm 3 form a frame structure. The movable rocker arm 3 also employs a frame-type structure to ensure the swing stability of the movable rocker arm 3, thus improving the overall working reliability of the mechanism.

It also needs to be noted that the fixed roller system includes a first fixed guide roller 12, a second fixed guide roller 13, a third fixed guide roller 14 and a fourth fixed guide roller 15 which are rotationally arranged in the fixed box 1. The fixed baling belt 6 is wound around the first fixed guide roller 12, the second fixed guide roller 13, the third fixed guide roller 14, the second fixed rocker arm roller 86, the fourth fixed guide roller 15 and the first fixed rocker arm roller 81 arranged in sequence. The fixed roller system and the fixed rocker arm 8 are in cooperation to tension the fixed baling belt 6, thus ensuring the smooth rotation of the fixed baling belt 6. In addition, a fixed motor 11 is connected to the first fixed guide roller 12, the fixed motor 11 drives the first fixed guide roller 12 to rotate clockwise, thus driving the fixed baling belt 6 to rotate around the fixed roller system and the fixed rocker arm 8.

Similarly, the movable roller system includes a first movable guide roller 22, a second movable guide roller 23, a third movable guide roller 24 and a fourth movable guide roller 25 which are rotationally arranged in the movable box 2. The movable baling belt 5 is wound around the first movable guide roller 22, the second movable rocker arm roller 32, the second movable guide roller 23, the third movable guide roller 24, the fourth movable guide roller 25 and the first movable rocker arm roller 31 arranged in sequence. The movable roller system provides guidance for the movable baling belt 5 and tensions the movable baling belt 5, and a movable motor 21 is connected to the first movable guide roller 22 to ensure the smooth rotation of the movable motor 21, thus providing powerful guarantee for the rolling and baling of the cotton bale 9.

A control system 200 of the baling mechanism 100 of the cotton picker is further provided in this embodiment, which includes a flow-sharing multi-way valve 206, a hydraulic pump 204, a fuel tank 209, an oil cooler 207, an oil filter 208, a fixed cylinder overflow valve 202, a movable cylinder overflow valve 203, a scaffolding cylinder overflow valve 205, and a controller 201. Overflow valves are mounted between the rod cavities and rodless cavities of the fixed rocker arm driving cylinder 7, the movable rocker arm driving cylinder 4 and the scaffolding cylinder 82, respectively. In the baling process, with the increase of the cotton bale 9, the overflow valve is intermittently turned on, and a piston rod of the cylinder extends out intermittently. The density of the cotton bale 9 in the baling process is controlled by setting the set pressures of the fixed cylinder overflow valve 202, the movable cylinder overflow valve 203 and the scaffolding cylinder overflow valve 205.

In the operation process, the cotton picker feeds the harvested seed cotton into the baling mechanism 100 from its bottom, the fixed motor 11 and the movable motor 21 are powered by the cotton picker to rotate clockwise, respectively, the fixed motor 11 drives the first fixed guide roller 12 to rotate clockwise, and the movable motor 21 drives the first movable guide roller 22 to rotate clockwise. The fixed baling belt 6 is driven by the first fixed guide roller 12 to wind and rotate around the first fixed guide roller 12, the second fixed guide roller 13, the third fixed guide roller 14, the fourth fixed guide roller 15, the first fixed rocker arm roller 81 and the second fixed rocker arm roller 86. The movable baling belt 5 is driven by the movable motor 21 to wind and rotate around the first movable guide roller 22, the second movable guide roller 23, the third movable guide roller 24, the fourth movable guide roller 25, the first movable rocker arm roller 31, and the second movable rocker arm roller 32. With continuous feeding of the materials, the fixed rocker arm driving cylinder 7 pushes the fixed rocker arm 8 to rotate counterclockwise, and the movable rocker arm driving cylinder 4 pushes the movable rocker arm 3 to rotate clockwise. A working oil port of the flow-sharing multi-way valve 206 is opened, the controller 201 outputs three paths of continuous and independent analog electric signals to the flow-sharing multi-way valve 206. Meanwhile, the scaffolding cylinder 82 pushes the first fixed rocker arm roller 81 to move, and the cotton bale 9 between the fixed baling belt 6 and the movable baling belt 5 is wound layer by layer and becomes large. After the cotton bale 9 is formed, the flow-sharing multi-way valve 206 is switched to a neutral position, the fixed rocker arm driving cylinder 7, the movable rocker arm driving cylinder 4 and the scaffolding cylinder 82 are self-locked, and meanwhile, port P and port T of the flow-sharing multi-way valve 206 are used for oil inlet and oil return, respectively. Afterwards, the movable box 2 is flipped by a certain angle relative to the fixed box 1, and the cotton bale 9 automatically rolls out under the action of the own gravity and the tensile force of the fixed baling belt 6, thus completing the bale unloading.

Embodiment IV

A baling mechanism 100 of a cotton picker in this embodiment includes a fixed box 1, and a movable box 2. The fixed box 1 is arranged on a frame of the cotton picker. A fixed rocker arm 4, a fixed rocker arm driving cylinder, a fixed roller system and a fixed baling belt 13 are arranged in the fixed box 1. One end of the fixed rocker arm 4 is rotatably connected to the fixed box 1, the other end of the fixed rocker arm 4 is hinged with the fixed rocker arm driving cylinder, and the fixed rocker arm driving cylinder can drive the fixed rocker arm 4 to swing. The fixed roller system includes multiple fixed guide rollers, and the fixed guide rollers are rotatably arranged in the fixed box 1. The fixed rocker arm 4 and the fixed guide roller are in cooperation to tension a fixed baling belt 13 and to drive the fixed baling belt 13 to rotate. The movable box 2 is hinged with the fixed box 1. A movable rocker arm 3, a movable rocker arm driving cylinder, a movable roller system and a movable baling belt 23 are arranged in the movable box 2. One end of the movable rocker arm 3 is rotatably connected to the movable box 2, and the other end of the movable rocker arm 3 is hinged with the movable rocker arm driving cylinder. The movable rocker arm driving cylinder can drive the movable rocker arm 3 to swing, and a swing end of the movable rocker arm 3 is arranged close to a swing end of the fixed rocker arm 4. The movable roller system includes multiple movable guide rollers, and the movable guide rollers are rotatably arranged in the movable box 2. The fixed rocker arm 4, the movable rocker arm 3 and the movable guide roller are in cooperation to tension a movable baling belt 23 and to drive the movable baling belt 23 to rotate. A cotton bale forming chamber is jointly enclosed and formed by the fixed baling belt 13 and the movable baling belt 23. A cotton feeding channel is formed by the bottom gap between the fixed baling belt 13 and the movable baling belt 23, and the cotton feeding channel is communicated with the cotton bale forming chamber. The fixed rocker arm driving cylinder drives the fixed rocker arm 4 to swing, the movable rocker arm driving cylinder drives the movable rocker arm 3 to swing, such that the volume of the cotton bale forming chamber can be increased to adapt to the increase of a rolled cotton bale 7.

The baling mechanism 100 of the cotton picker of this embodiment also adopts the form of the fixed baling belt 13 and the movable baling belt 23, and the automatic bale unloading is achieved when the fixed box 1 is flipped relative to the movable box 2, and the baling belts have no influence on each other during the bale unloading, and rapid bale unloading and resetting can be achieved.

In this embodiment, the fixed rocker arm 4 includes a fixed rocker arm body, and a first fixed rocker arm roller 41 and a second fixed rocker arm roller 42 rotationally arranged on the fixed rocker arm body. One end of the fixed rocker arm body is rotatably connected to the fixed box 1, and the fixed rocker arm body is of a bent structure. The first fixed rocker arm roller 41 is arranged at the bend of the fixed rocker arm body, and the second fixed rocker arm roller 42 is arranged at the other end of the fixed rocker arm body. The fixed rocker arm body is connected to the fixed rocker arm driving cylinder. The structure of the movable rocker arm 3 is similar to that of the fixed rocker arm 4. The movable rocker arm 3 includes a movable rocker arm body, and a first movable rocker arm roller 31 and a second movable rocker arm roller 32 rotationally arranged on the movable rocker arm body. One end of the movable rocker arm body is rotatably connected to the movable box 2, the movable rocker arm body is of a bent structure, the first movable rocker arm roller 31 is arranged at the bend of the movable rocker arm body, and the second movable rocker arm roller 32 is arranged on the other end of the movable rocker arm body. The movable rocker arm body is connected to the movable rocker arm driving cylinder.

It needs to be noted that the baling mechanism 100 of a cotton picker in this embodiment further includes a limit baling belt 52. The limit baling belt 52 is tensioned by using a first driven roller 51 and a second driven roller 53, and the first driven roller 51 and the second driven roller 53 are rotatably arranged in the fixed box 1. A cotton bale forming chamber is jointly enclosed and formed by the fixed baling belt 13, the limit baling belt 52 and the movable baling belt 23. When the fixed rocker arm driving cylinder and the movable rocker arm driving cylinder reach a maximum stroke, the first driven roller 51 and the second driven roller 53 are located between the second fixed rocker arm roller 42 and the second movable rocker arm roller 32 to limit a maximum diameter of the cotton bale 7.

The fixed roller system includes a first fixed guide roller 11, a second fixed guide roller 12, a third fixed guide roller 14 and a fourth fixed guide roller 15 which are rotationally arranged in the fixed box 1. The fixed baling belt 13 is wound around the first fixed guide roller 11, the second fixed guide roller 12, the third fixed guide roller 14, the first fixed rocker arm roller 41, the fourth fixed guide roller 15 and the second fixed rocker arm roller 42 arranged in sequence. A feeding device 6 is arranged at a position, close to the first fixed guide roller 11, in the fixed box 1. The movable roller system includes a first movable guide roller 21, a second movable guide roller 22, a third movable guide roller 24 and a fourth movable guide roller 25 which are rotationally arranged in the movable box 2. The movable baling belt 23 is wound around the first movable guide roller 21, the first movable rocker arm roller 31, the second movable guide roller 22, the third movable guide roller 24, the fourth movable guide roller 25 and the second movable rocker arm roller 32 arranged in sequence. In practical application, the first fixed guide roller 11 and the first movable guide roller 21 may be connected to a driver thus as driving rollers to drive the fixed baling belt 13 and the movable baling belt 23 to rotate. One of the fixed roller system and the movable roller system can be selected and connected to a driver as the driving roller, which can be adjusted according to the actual working conditions, thus improving the flexibility and adaptability of the mechanism.

In the operation process, seed cotton picked by the cotton picker is conveyed into the baling mechanism 100 through the feeding device. The fixed baling belt 13 in the fixed box 1 is driven by the first fixed guide roller 11 to wind and rotate around the first fixed guide roller 11, the second fixed guide roller 12, the third fixed guide roller 14, the fourth fixed guide roller 15, the first fixed rocker arm roller 41 and the second fixed rocker arm roller 42. The movable baling belt 23 in the movable box 2 is driven by the first movable guide roller 21 to wind and rotate around the first movable guide roller 21, the second movable guide roller 22, the third movable guide roller 24, the fourth movable guide roller 25, the first movable rocker arm roller 31 and the second movable rocker arm roller 32. At the beginning of baling operation, a cotton bale forming chamber is formed in a space between the fixed baling belt 13 and the movable baling belt 23. With the continuously increasing feed, a fixed rocker arm is pushed by a fixed rocker arm driving cylinder (not shown in the figure) to rotate counterclockwise, and the movable rocker arm 3 is driven by the movable rocker arm driving cylinder (not shown in the figure) to rotate clockwise, such that the cotton bale 7 between the fixed baling belt 13 and the moving baling belt 23 gradually becomes large. After a diameter of the cotton bale 7 is increased to a certain extent, an upper side of the cotton bale 7 is in contact with the limit baling belt 52, the limit baling belt 52 is driven through a friction force between the rotating cotton bale 7 and the limit baling belt 52 to rotate around the first driven roller 51 and the second driver roller 53, and the diameter of the cotton bale 7 is limited by the limit baling belt 52. When the bale needs to be unloaded, the movable box 2 is flipped by a certain angle relative to the fixed box 1, and the cotton bale 7 is automatically unloaded under the action of the own gravity.

A control system 200 of a baling mechanism 100 of the cotton picker is also provided in this embodiment, which includes a controller 201, an overflow valve I 203, an overflow valve II 206, a gear pump 204, a pressure indicator 202, a multi-way valve 207, an oil cooler 208, an oil filter 209, and a hydraulic fuel tank 205. An oil outlet port of the gear pump 204 is connected to an oil inlet port P of the multi-way valve 207, an oil port A of the multi-way valve 207 is connected to rodless cavities of the movable rocker arm driving cylinder and the fixed rocker arm driving cylinder, respectively. An oil port B is connected to rod cavities of the fixed rocker arm driving cylinder and the movable rocker arm driving cylinder, respectively. An oil outlet port T is connected to the oil cooler 208, the oil filter 209 and the hydraulic fuel tank 205 in sequence. Both the pressure indicators 202 and the overflow valves are mounted between the rod cavities and rodless cavities of the movable rocker arm driving cylinder and the fixed rocker arm driving cylinder, respectively. The controller 201 is connected to the multi-way valve 207, and independently output two paths of analog electric signals to control the flow rate of the multi-way valve 207.

The baling mechanism 100 of the cotton picker in this embodiment includes the following working process in one working cycle:

Baling process, in an initial state, the cotton bale forming chamber is in a empty state, the seed cotton is fed into the baling mechanism 100 by the feeding device, and meanwhile, the gear pump 204 of the control system 200 starts to work, oil liquid enters port P of the multi-way valve 207, and the multi-way valve 207 controls two-way flow rates according to a preset proportion. In this process, the overflow valve I 203 and the overflow valve II 206 are used to restrain the tensile force of the fixed baling belt 13 and the movable baling belt 23, respectively, thus determining a baling density of the cotton bale 7. The pressure indicator 202 can transmit oil pressure signals in the fixed rocker arm driving cylinder and the movable rocker arm driving cylinder to a cab of the cotton picker, respectively, and a driver can determine whether the baling is abnormal or not according to oil pressure change conditions.

Bin opening and bale unloading process: when the fixed rocker arm driving cylinder and the movable rocker arm driving cylinder reach the maximum stroke, the baling process is finished, the multi-way valve 207 is switched to a neutral position (the port P is used for oil inlet, and the port T is used for oil outlet, and the oil is returned through the oil cooler 208 and the oil filter 209), the fixed rocker arm driving cylinder and the movable rocker arm driving cylinder are both in a locked state, thus ensuring a smooth bin opening and bale unloading of the movable box.

Bin closing process: after the bin is opened for bale unloading, the fixed baling belt 13 and the movable baling belt 23 are both in a loosening state, and the multi-way switch 207 is switched to a working station when the bin is closed. To make the baling belt in a tightening state in the bin closing process, the controller 201 outputs continuous analog voltage signals $V_1$ and $V_2$ to the multi-way valve 207 to control the flow rates of two oil circuits of the multi-way valve 207 (the oil circuit where the fixed rocker arm driving cylinder is located and the oil circuit where the movable rocker arm driving cylinder is located) according to the signal variation law, such that the flow rates of the two oil circuits can continuously change at a non-uniform speed according to a predetermined voltage signal, and then the stroke $S_1(t)$ of the fixed rocker arm driving cylinder and the stroke $S_2(t)$ of the movable rocker arm 3 driving cylinder are controlled to continuously change at a non-uniform speed according to the predetermined law. After the bin is closed, the movable box 2 is in an initial state, and piston rods of the fixed rocker arm driving cylinder and the movable rocker arm driving cylinder are completely retracted.

A cotton picker including the baling mechanism 100 of the cotton picker is also provided in this embodiment, referring to FIG. 33 and FIG. 34 for detail, so as to effectively improve the baling efficiency of the cotton picker.

Specific examples are used herein for illustration of the principles and embodiments of the present disclosure. The description of the above embodiments is merely used to help illustrate the method and its core ideas of the present disclosure. In addition, those skilled in the art can make various modifications in terms of specific embodiments and scope of application in accordance with the ideas of the present disclosure. In conclusion, the content of this specification shall not be construed as a limitation to the present disclosure.

What is claimed is:

1. A baling mechanism of a cotton picker, comprising:
a fixed box, arranged on a frame of the cotton picker, wherein a fixed rocker arm, a fixed rocker arm driving cylinder, a fixed roller system and a fixed baling belt are arranged in the fixed box, one end of the fixed rocker arm is rotatably connected to the fixed box, and the fixed rocker arm is hinged with the fixed rocker arm driving cylinder, which drives the fixed rocker arm to swing; the fixed roller system comprises a plurality of fixed guide rollers, the fixed guide rollers are rotatably arranged in the fixed box, the fixed rocker arm and the fixed guide roller are in cooperation to tension the fixed baling belt and to drive the fixed baling belt to rotate;
a movable box, hinged with the fixed box, wherein a movable rocker arm, a movable rocker arm driving cylinder, a movable roller system and a movable baling belt are arranged in the movable box, one end of the movable rocker arm is rotatably connected to the movable box, and the movable rocker arm is hinged with the movable rocker arm driving cylinder, which moves the movable rocker arm to swing, a swing end of the movable rocker arm is arranged close to a swing end of the fixed rocker arm; the movable roller system comprises a plurality of movable guide rollers, and the movable guide rollers are rotatably arranged in the movable box; and the fixed rocker arm, the movable rocker arm and the movable guide rollers are in cooperation to tension the movable baling belt and to drive the movable baling belt to rotate;
a cotton bale forming chamber is jointly enclosed and formed by the fixed rocker arm, the fixed baling belt and the movable baling belt, a cotton feeding channel is formed by a bottom gap between the fixed baling belt and the movable baling belt, the cotton feeding channel is communicated with the cotton bale forming chamber, the fixed rocker arm is driven by the fixed rocker arm driving cylinder to swing, the movable rocker arm is driven by the movable rocker arm driving cylinder to swing, such that a volume of the cotton bale forming chamber is capable of being increased to adapt to an increase of a rolled cotton bale.

2. The baling mechanism of the cotton picker according to claim 1, wherein the fixed rocker arm comprises a fixed rocker arm articulated shaft, a first fixed rocker arm roller, a second fixed rocker arm roller, a third fixed rocker arm roller, a first fixed connecting rod, and a second fixed connecting rod; the fixed rocker arm articulated shaft is hinged with the fixed box, the first fixed connecting rod is fixedly connected to the fixed rocker arm articulated shaft and the second fixed connecting rod, the first fixed rocker arm roller and the second fixed rocker arm roller are rotatably arranged on the second fixed connecting rod, and located on one end, away from the first fixed connecting rod, of the second fixed connecting rod; the third fixed rocker arm roller is arranged at a joint of the first fixed connecting rod and the second fixed connecting rod; the fixed baling belt and the movable baling belt both pass between the first fixed rocker arm roller and the second fixed rocker arm roller, the fixed baling belt is abutted against the second fixed rocker arm roller and the third fixed rocker arm roller, and the movable baling belt is abutted against the first fixed rocker arm roller;

two groups of the first fixed connecting rods and two groups of the second fixed connecting rods are provided, thus making the fixed rocker arm form a frame structure.

3. The baling mechanism of the cotton picker according to claim 2, wherein the fixed rocker arm further comprises a fixed driving rod, one end of the fixed driving rod is connected to the fixed rocker arm articulated shaft, and an other end of the fixed driving rod is hinged with the fixed rocker arm driving cylinder.

4. The baling mechanism of the cotton picker according to claim 2, wherein the fixed roller system comprises a first fixed guide roller, a second fixed guide roller, a third fixed guide roller and a fourth fixed guide roller which are rotationally arranged in the fixed box; the fixed baling belt is wound around the first fixed guide roller, the second fixed guide roller, the third fixed guide roller, the third fixed rocker arm roller, the fourth fixed guide roller and the second fixed rocker arm roller arranged in sequence.

5. The baling mechanism of the cotton picker according to claim 2, wherein the movable rocker arm comprises a movable rocker arm articulated shaft, a movable rocker arm roller and a movable connecting rod; the movable rocker arm articulated shaft is rotatably connected to the movable box, the movable rocker arm articulated shaft is connected to one end of the movable connecting rod, an other end of the movable connecting rod is hinged with the movable rocker arm roller, and the movable baling belt is abutted against the movable rocker arm roller;

two groups of the movable connecting rods are provided, and the two group of the movable connecting rods are arranged at two axial ends of the movable rocker arm articulated shaft and the movable rocker arm roller, respectively, thus making the movable rocker arm form a frame structure.

6. The baling mechanism of the cotton picker according to claim 5, wherein the movable rocker arm further comprises a movable driving rod, one end of the movable driving rod is connected to the movable rocker arm articulated shaft, and an other end of the movable driving rod is hinged with the movable rocker arm driving cylinder.

7. The baling mechanism of the cotton picker according to claim 5, wherein the movable roller system comprises a first movable guide roller, a second movable guide roller, a third movable guide roller and a fourth movable guide roller which are rotationally arranged in the movable box; the movable baling belt is wound around the first movable guide roller, the movable rocker arm roller, the second movable guide roller, the third movable guide roller, the fourth movable guide roller and the first fixed rocker arm roller arranged in sequence.

8. The baling mechanism of the cotton picker according to claim 1, wherein the fixed rocker arm comprises a first fixed rocker arm roller, a scaffolding cylinder, a fixed support arm, a fixed side arm, a fixed rotating shaft, and a second fixed rocker arm roller; the fixed rotating shaft is rotatably arranged in the fixed box, one end of the fixed support arm and one end of the fixed side arm are both fixed to the fixed rotating shaft, an other end of the fixed support arm is hinged with the fixed rocker arm driving cylinder, and an other end of the fixed side arm is hinged with the second fixed rocker arm roller; a fixed end of the scaffolding cylinder is fixed to the fixed side arm, and a free end of the scaffolding cylinder is hinged with the first fixed rocker arm roller; and the fixed baling belt bypasses the first fixed rocker arm roller and the second fixed rocker arm roller;

two groups of the fixed support arms, two groups of the fixed side arms and two groups of the scaffolding cylinders are provided, thus making the fixed rocker arm form a frame structure;

the movable rocker arm comprises a first movable rocker arm roller, a second movable rocker arm roller, a movable side arm, a movable support arm, and a movable rotating shaft; the movable rotating shaft is rotatably arranged in the movable box, one end of the movable side arm and one end of the movable support arm are both fixed to the movable rotating shaft, an other end of the movable support arm is hinged with the movable rocker arm driving cylinder; the first movable rocker arm roller and the second movable rocker arm roller are both hinged with another end of the movable side arm, and the movable baling belt bypasses the first movable rocker arm roller and the second movable rocker arm roller;

two groups of the movable side arms and two groups of the movable support arms are provided, thus making the movable rocker arm form a frame structure.

9. The baling mechanism of the cotton picker according to claim 8, wherein the fixed roller system comprises a first fixed guide roller, a second fixed guide roller, a third fixed guide roller and a fourth fixed guide roller which are rotationally arranged in the fixed box; the fixed baling belt is wound around the first fixed guide roller, the second fixed guide roller, the third fixed guide roller, the second fixed rocker arm roller, the fourth fixed guide roller and the first fixed rocker arm roller arranged in sequence; and a fixed motor is connected to the first fixed guide roller;

the movable roller system comprises a first movable guide roller, a second movable guide roller, a third movable guide roller and a fourth movable guide roller which are rotationally arranged in the movable box; the movable baling belt is wound around the first movable guide roller, the second movable rocker arm roller, the second movable guide roller, the third movable guide roller, the fourth movable guide roller and the first movable rocker arm roller arranged in sequence; and a movable motor is connected to the first movable guide roller.

10. The baling mechanism of the cotton picker according to claim 1, wherein the fixed rocker arm comprises a fixed rocker arm body, and a first fixed rocker arm roller and a second fixed rocker arm roller which are rotationally arranged on the fixed rocker arm body; one end of the fixed rocker arm body is rotatably connected to the fixed box, the fixed rocker arm body is of a bent structure, and the first fixed rocker arm roller is arranged at a bend of the fixed rocker arm body; the second fixed rocker arm roller is arranged on an other end of the fixed rocker arm body, and the fixed rocker arm body is connected to the fixed rocker arm driving cylinder;

the movable rocker arm comprises a movable rocker arm body, and a first movable rocker arm roller and a second movable rocker arm roller rotationally arranged on the movable rocker arm body; one end of the movable rocker arm body is rotatably connected to the movable box, the movable rocker arm body is of a bent structure, the first movable rocker arm roller is arranged at a bend of the movable rocker arm body, the second movable rocker arm roller is arranged on an other end of the movable rocker arm body, and the movable rocker arm body is connected to the movable rocker arm driving cylinder.

11. The baling mechanism of the cotton picker according to claim 10, further comprising a limit baling belt, wherein the limit baling belt is tensioned by using a first driven roller and a second driven roller, the first driven roller and the second driven roller are both rotatably arranged in the fixed box, and the cotton bale forming chamber is jointly enclosed and formed by the fixed baling belt, the limit baling belt and the movable baling belt; when the fixed rocker arm driving cylinder and the movable rocker arm driving cylinder reach a maximum stroke, the first driven roller and the second driven roller are located between the second fixed rocker arm roller and the second movable rocker arm roller to limit a maximum diameter of a cotton bale.

12. The baling mechanism of the cotton picker according to claim 11, wherein the fixed roller system comprises a first fixed guide roller, a second fixed guide roller, a third fixed guide roller and a fourth fixed guide roller which are rotationally arranged in the fixed box; the fixed baling belt is wound around the first fixed guide roller, the second fixed guide roller, the third fixed guide roller, the first fixed rocker arm roller, the fourth fixed guide roller and the second fixed rocker arm roller arranged in sequence; and a feeding device is arranged at a position, close to the first fixed guide roller, in the fixed box;

the movable roller system comprises a first movable guide roller, a second movable guide roller, a third movable guide roller and a fourth movable guide roller which are rotationally arranged in the movable box; the movable baling belt is wound around the first movable guide roller, the first movable rocker arm roller, the second movable guide roller, the third movable guide roller, the fourth movable guide roller and the second movable rocker arm roller arranged in sequence.

13. The baling mechanism of the cotton picker according to claim 1, wherein the fixed box is hinged with the frame of the cotton picker, and a hinge point of the fixed box and the frame of the cotton picker is away from a hinge point of the fixed box and the movable box.

14. The baling mechanism of the cotton picker according to claim 1, wherein angle sensors are arranged in the fixed box and the movable box to monitor swing angles of the fixed rocker arm and the movable rocker arm, and the angle sensors are connected to the fixed rocker arm and the movable rocker arm by using a parallelogram mechanism.

15. A control system of the baling mechanism of the cotton picker according to claim 1, wherein both the fixed rocker arm driving cylinder and the movable rocker arm driving cylinder are communicated with a fuel tank of the cotton picker by using a multi-way valve, the fixed rocker arm driving cylinder is connected in parallel with a first overflow valve, and the movable rocker arm driving cylinder is connected in parallel with a second overflow valve;

the control system of the baling mechanism of a cotton picker comprises the following operation processes:

baling process: a cotton bale forming chamber is in a empty state, the multi-way valve is configured to control flow rates of oil circuits where the fixed rocker arm driving cylinder and the movable rocker arm driving cylinder are located, and the first overflow valve and the second overflow valve are configured to restrain a tensile force of the fixed baling belt and the movable baling belt, thus determining a baling density of the cotton bale;

bin opening and bale loading process: when the fixed rocker arm driving cylinder and the movable rocker arm driving cylinder reach a maximum stroke, the baling process is finished, the multi-way valve is switched to a non-working position, the fixed rocker arm driving cylinder and the movable rocker arm driving cylinder are both in a locked state, such that the movable box is capable of rotating smoothly to open the bin and unload the bale; and bin closing process: after the bin is opened for unloading the bale, the fixed baling belt and the movable baling belt are in a loosening state, the multi-way valve is switched to a working position to control the flow rates of oil circuits where the fixed rocker arm driving cylinder and the movable rocker arm driving cylinder are located, the fixed rocker arm driving cylinder and the movable rocker arm driving cylinder are reset to close the bin, and after the bin is closed, the movable box returns to an original state.

\* \* \* \* \*